US012686133B2

(12) United States Patent
Keit et al.

(10) Patent No.: US 12,686,133 B2
(45) Date of Patent: Jul. 21, 2026

(54) ROLLER TOOL FOR PART FORMING

(71) Applicant: Machina Labs, Inc., Chatsworth, CA (US)

(72) Inventors: Aaron David Keit, Simi Valley, CA (US); James George Selin, Simi Valley, CA (US); Kyle Hickey, Moorpark, CA (US); Mark Anders, La Cañada Flintridge, CA (US)

(73) Assignee: Machina Labs, Inc., Chatsworth, CA (US)

( * ) Notice: Subject to any disclaimer, the term of this patent is extended or adjusted under 35 U.S.C. 154(b) by 84 days.

(21) Appl. No.: 18/931,445

(22) Filed: Oct. 30, 2024

(65) Prior Publication Data

US 2025/0135653 A1 May 1, 2025

Related U.S. Application Data

(60) Provisional application No. 63/681,644, filed on Aug. 9, 2024, provisional application No. 63/594,922, filed on Oct. 31, 2023.

(51) Int. Cl.
*B25J 11/00* (2006.01)
*B25J 13/08* (2006.01)
*B25J 15/00* (2006.01)

(52) U.S. Cl.
CPC ......... *B25J 11/0075* (2013.01); *B25J 13/085* (2013.01); *B25J 13/087* (2013.01); *B25J 15/0019* (2013.01)

(58) Field of Classification Search
CPC .... B25J 11/0075; B25J 13/085; B25J 13/087; B25J 15/0019; B25J 9/1682; B25J 11/005;

(Continued)

(56) References Cited

U.S. PATENT DOCUMENTS 4,648,934 A 3/1987 Kiss
5,015,169 A 5/1991 Inzinna et al.
(Continued)

FOREIGN PATENT DOCUMENTS

DE 102016003840 A1 10/2017
WO WO 2007/082972 7/2007

OTHER PUBLICATIONS

PCT International Search Report and Written Opinion, PCT Application No. PCT/US2024/053841, Jan. 27, 2025, 14 pages.
(Continued)

*Primary Examiner* — B M M Hannan
(74) *Attorney, Agent, or Firm* — Fenwick & West LLP

(57) ABSTRACT

A system can form a part in an initial geometry into a desired geometry. The system may include a roller tool and a robot arm that: (a) presses the roller tool onto a surface of the part and (b) moves the pressed roller tool along the surface of the part to form the desired geometry. The roller tool includes a ball and a support with a socket that receives the ball and enables the ball to rotate in the socket. The support may include a channel configured to carry fluid through the support toward the ball or away from the ball. The socket may deform such that contact area of the ball with the socket increases in response to the ball being pressed onto the surface above a threshold pressure.

20 Claims, 34 Drawing Sheets

(58) Field of Classification Search
CPC ........... G05B 2219/39121; G05B 2219/45234;
B21D 31/005; B21D 39/023
USPC ........................................................ 700/245
See application file for complete search history.

(56) References Cited

U.S. PATENT DOCUMENTS

| | | | |
|---|---|---|---|
| 7,421,314 B2 * | 9/2008 | Stoddard ............... | B25J 9/1607 |
| | | | 318/568.13 |
| 8,893,758 B2 * | 11/2014 | Genssen ................. | B32B 37/10 |
| | | | 156/441 |
| 2017/0028458 A1 | 2/2017 | Wilkosz et al. | |
| 2019/0111575 A1 | 4/2019 | Asano et al. | |
| 2022/0009217 A1 | 1/2022 | Brockschmidt et al. | |
| 2022/0212301 A1 * | 7/2022 | Mehr ..................... | B21D 43/28 |
| 2022/0212307 A1 * | 7/2022 | Mehr ..................... | B25J 9/1664 |
| 2022/0212341 A1 | 7/2022 | Mehr | |
| 2022/0274532 A1 | 9/2022 | Olaison et al. | |
| 2022/0281123 A1 * | 9/2022 | Robbins ................. | B25J 9/1671 |

OTHER PUBLICATIONS

INOVATEC. "Effects of Ball Burnishing Process with Stainless
Steel Media," Inovatec Machinery, Jul. 2, 2020, pp. 1-9.

* cited by examiner

Optical Tracker 405B

Tracker Targets 410

Robot 400B

Tracker Targets 410

Robot 400A

Optical Tracker 405A

Reconstruced
3D Surfaces
Using the
Scanner

Clamp
530

Sheet
520

Deformation
525

Forming Path
600B

Forming Path
600A

Stylus 705

Sheet 700

Sheet Deformation 710

Roller Tool
820

Roller
825

Support
830

Magnified View
of Tip 815

Rotational
Axis
817A

Rotational
Axis
817B

Support
812

Roller
810

Roller Tool
805

Forming

Sheet Metal
1015

Deformation
1005

Stylus
1010

Arm
1000

Trimming

Power Supply 1125

Controller 1120

Kinematic Component 1105

Ultrasonic End Effector 1115

Metal Part 1110

1100

Part Formed Using Two Robot Arms 1515

Tear 1520

Part Formed Using Single Robot Arm 1510

Part Design 1505

Roller Tool
1701

Channel
1717

Socket
1705

Roller Tool    Ball
1701        1703

Support
1709

Channel
1717

Roller Tool
1701

Roller Tool
1701

Roller Tool 1701

Relieved Area 1713

Roller Tool 1701

Relieved Areas 1713

Channel 1717

Roller Tool 1701

Coil 1729

Roller Tool 1701

Magnets 1727

Support 1709

Roller Tool
1701

O-Ring
1770

Roller Tool
1701

Flow
Fuse
1905

ROLLER TOOL FOR PART FORMING

CROSS-REFERENCE TO RELATED APPLICATION

This application claims priority to, and the benefit of, U.S. Provisional Patent Application Ser. No. 63/594,922, "Sheet Part Forming Components and Methods," filed Oct. 31, 2023 and U.S. Provisional Patent Application Ser. No. 63/681,644, "Roller Tool For Part Forming," filed Aug. 9, 2024, each of which is incorporated by reference.

TECHNICAL FIELD

This disclosure relates generally to robotic part forming, and more particularly, to roller tools used to form a part into a desired geometry.

BACKGROUND

Description of Related Art

Sheet metal parts are used in a multitude of applications and across many different industries (e.g., in aerospace, automotive, biomedical, and consumer electronics industries). Sheet metal part forming is the manufacturing process through which sheet metal parts are made. However, sheet metal part forming is very tool intensive, which makes it costly and time consuming to fabricate sheet metal parts. A method for sheet metal part forming is stamping. In stamping, a series of female and male dies that are specific to each design and material are fabricated (tooling). A sheet metal part is formed in a press machine by sandwiching sheet metal between the two dies with force. Stamping requires a large investment in dies and is not accommodating to changes in design and material, making the sheet metal forming process expensive and time-consuming.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

Figure 1:
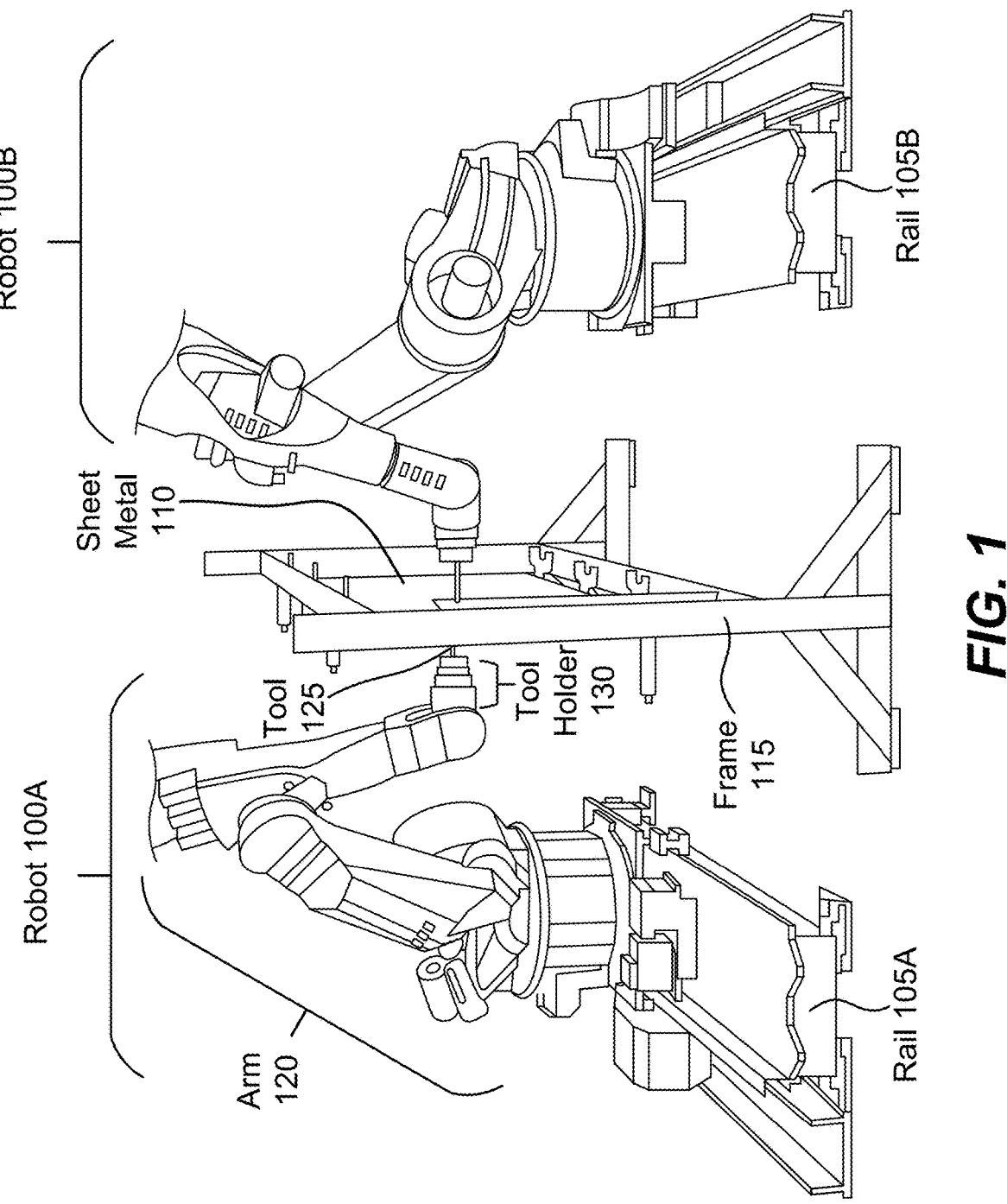
FIG. 1 is a perspective view of a robotic setup for part forming, according to an embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Some embodiments relate to various roller tool end effectors that may be used to form a part in an initial geometry into a desired geometry. A roller tool includes a ball in a socket of a support. Example features for these roller tools include beveled edges, relieved areas in the socket, channels for fluids, covers, and magnets.

In a first embodiment a system is configured to form a part in an initial geometry into a desired geometry, the system including: a roller tool; and a robot arm configured to: (a) press the roller tool onto a surface of the part and (b) move the pressed roller tool along the surface of the part to form the desired geometry, wherein the roller tool includes: a ball;

and a support with a socket that receives the ball and enables the ball to rotate in the socket, the support including a channel configured to carry fluid through the support toward the ball or away from the ball, the socket configured to, responsive to the ball being pressed onto the surface above a threshold pressure, deform such that contact area of the ball with the socket increases.

In a second embodiment a system is configured to form a part in an initial geometry into a desired geometry, the system including: a roller tool; and a robot arm configured to: (a) press the roller tool onto a surface of the part and (b) move the pressed roller tool along the surface of the part to form the desired geometry, wherein the roller tool includes: a ball; and a support with a socket that receives the ball and enables the ball to rotate in the socket, the socket configured to, responsive to the ball being pressed onto the surface above a threshold pressure, deform such that contact area of the ball with the socket increases.

In a third embodiment a system is configured to form a part in an initial geometry into a desired geometry, the system including: a roller tool; and a robot arm configured to: (a) press the roller tool onto a surface of the part and (b) move the pressed roller tool along the surface of the part to form the desired geometry, wherein the roller tool includes: a ball; and a support with a socket that receives the ball and enables the ball to rotate in the socket, the support including a channel configured to carry fluid through the support toward the ball or away from the ball.

1. Robotic Sheet Metal Part Forming

Increasing the speed and decreasing the cost to manufacture sheet metal parts is desirable for enhancing product development in all stages of design and manufacturing. In light of this, some embodiments relate to an intelligent machine learning-based system that automates object process parameter generation for real-time control of novel robotic forming of sheet metal, plastics, polymers, and composite parts. Relative to conventional techniques, the disclosed (e.g., fast forming) techniques may enable faster prototyping and may enable rapid customization of mass-produced products. Agile production or prototyping in turn enables development of better-quality products and streamlining production. It may also increase industrial competitiveness in both mature and emerging markets by reducing the time and capital used for developing new components. The benefits may extend further for "lightweighting" strategies employed in various industries (e.g., aerospace and automotive) that want to move towards lighter and higher strength alloys but are slowed down by testing of these alloys. For simplicity, the below descriptions refer to forming parts from sheet metal. However, as indicated above, embodiments described herein may be applicable to forming parts from other materials, such as plastics, polymers, and composites.

Robotic sheet metal part forming overcomes the restrictions of the traditional methods by reducing or removing fabrication of tooling and dies from the production process. Robotic sheet part forming is a sheet metal part forming technique where a sheet is formed into a desired geometry by a series of (e.g. small) incremental deformations applied by a robot. For example, the robot is outfitted with a stiff stylus that delivers deformations to the sheet. Multiple robots may be used in the process to provide more accurate control of the deformations.

FIG. 1 illustrates an example embodiment of a setup for robotic sheet metal part forming. Two robots 100A and 100B face each other on respective rails 105A and 105B on opposite sides of the sheet metal 110. The sheet metal is supported by a frame 115 (also referred to as a fixture). Specifically, edges of the sheet metal are coupled (e.g., clamped) to the frame to hold the sheet metal in place. The sheet metal is fixed between the two robots to allow easy access from both robots to opposite sides of the sheet. The robots may be high payload industrial robotic arms that can exert forces sufficient to deform the sheet metal (e.g., up to 20,000 N). The amount of force exerted may depend on the material strength and thickness of the sheet. For example, for 2 mm 5xxx aluminum (including aluminum alloys), the peak forces may be 2,000N. In another example, for high strength martensitic steel, the peak forces may be 20,000N. The amount of force may also depend on process parameters. For example, there may be a tradeoff between time duration and force (e.g., a 1 mm stainless steel part takes 4 hours to form with a peak force of 4,000N but it takes 8 hours to form if the peak force is 3,000N). The robots may comprise an articulated 6-axis robotic arm (e.g., arm 120) capable of moving a tool (e.g., tool 125) (also referred to as an end effector) attached to the end of the arm in a three-dimensional space according to 6 degree of freedom motion. The arm may include an actuator system configured to move the robot in space. For example, each segment of the robot arm includes an actuator to move it relative to another arm segment. The end of the robot arm includes a tool holder (e.g., tool holder 130) that enables one or more selectable types of tools to be attached. The tools can include, for example, a hard stylus having ends of varying diameters, shapes, or materials, a roller tool as described below, a spindle tool, a laser tool, a plasma torch, a cutting tool, or a hole making tool. The robots are also slidable along the rails to enable the robots to operate over a wide range of sheet metal size sand sizes of the part being fabricated. For example, the part can be as small as a few cubic inches or as big as a few cubic feet (in the volume it occupies). The robot's arms may be controlled by a controller (e.g., an external computation system) that takes into account the geometry of the final part and signals from one or more various sensors installed on the robot. The sensors may include, for example, accelerometers, gyroscopes, pressure sensors, or other sensors for detecting motion, position, and interactions of the robot with the sheet metal.

Figure 15:
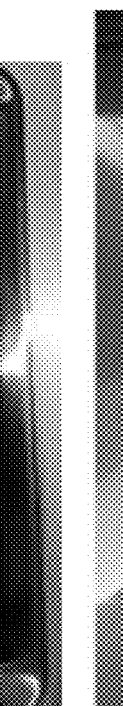
FIG. 15 includes images of two different parts made using a same part design and different forming techniques, according to an embodiment.
Figure 15:
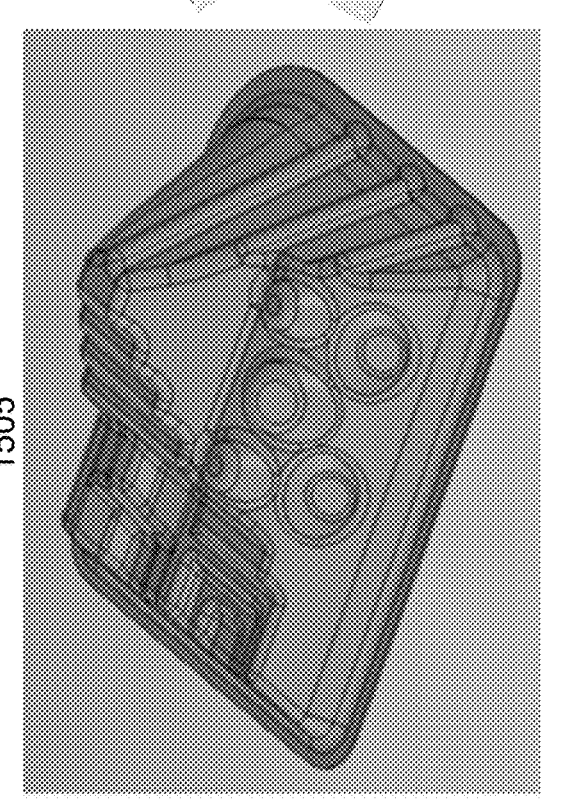

The use of two robots (one on each side of the sheet) may provide several advantages. For example, if only a single robot is used, the sheet may globally deform (instead of locally deform). Thus, using two robots may enable localized deformations. A second robot (also referred to as a support robot) may reduce or prevent tearing of the part by providing supporting pressure on the opposite side of the part. The location of the robots (and their end effectors) with respect to each other may be based on the design of the part and the material and thickness of the sheet. These locations may be determined by a model (described further below). An example of the advantages of two robots is illustrated in FIG. 15. FIG. 15 includes a part design 1505 that illustrates the design of a part to be formed. The images on the right illustrate parts formed based on the design 1505. The bottom right image illustrates a part 1510 formed using only one robot and the top right image illustrates a part 1515 formed using two robots. As illustrated, part 1515 includes more details and more closely resembles the part in 1505. Additionally, the part 1501 includes a tear 1520.

A controller (also "control system") may receive and process sensor data from the sensors to determine the proper parameters (e.g., joint angle values for each joint of the robotic arm) and control the robot arms accordingly. In some embodiments, the robots are controlled to pinch or otherwise apply pressure to the sheet metal with a hard implement (e.g., a stylus) or other tool to form the sheet of metal in accordance with a program applied by the controller to result in a desired geometry. For example, the program controls the robot arms to move in a particular sequence and apply the tool to the sheet metal according to particular programmed parameters at each step (e.g., time step) of the sequence to achieve a programmed geometry. The program (via the robotic arms) may cause the different applied tools to bend, pinch, cut, heat, seam, or otherwise form the metal in accordance with the program.

Figures 7A, 7B, 7C, 7D:
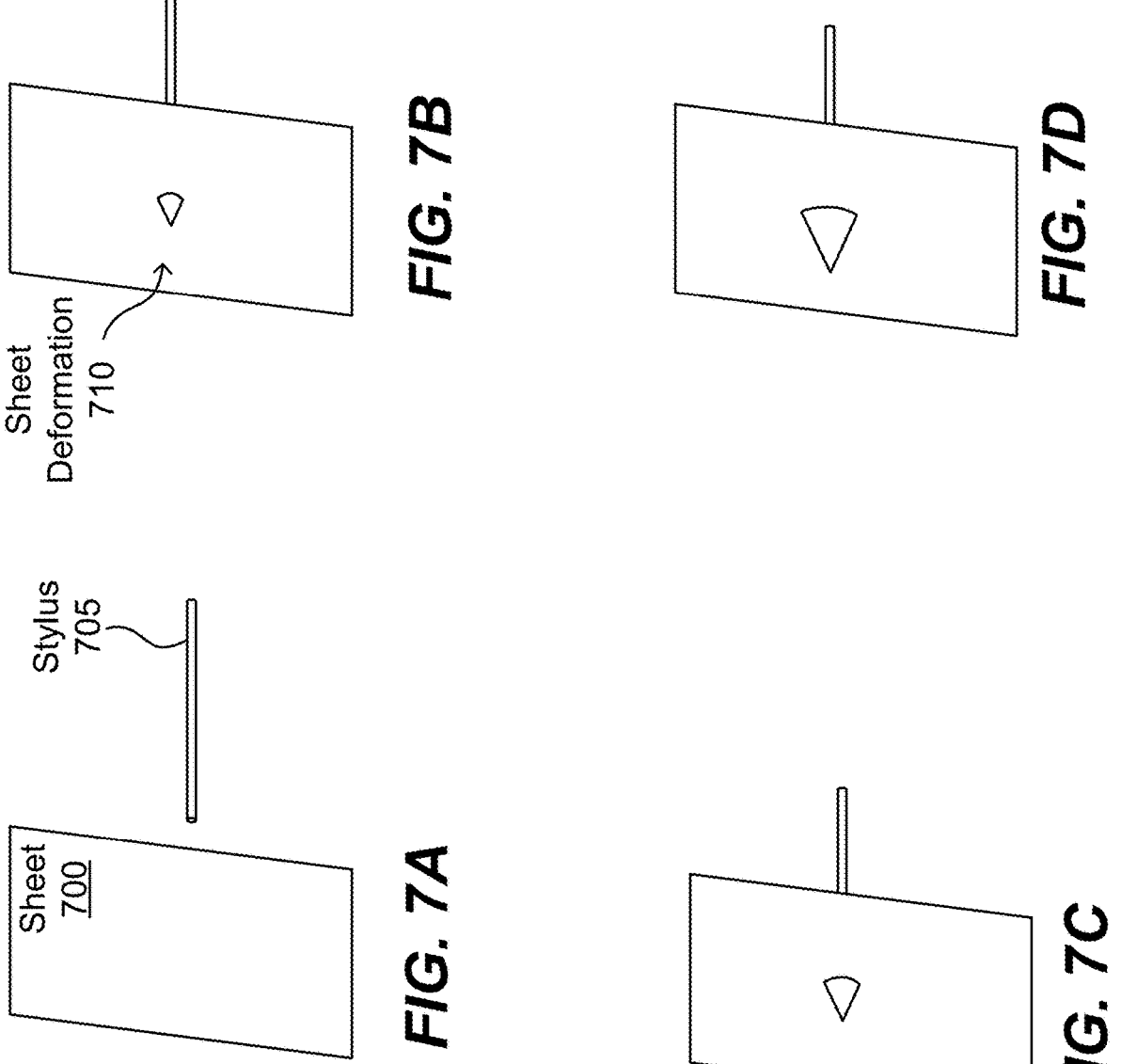
FIGS. 7A-7D illustrate a forming process, according to an embodiment.

An example part forming process is illustrated in FIGS. 7A-7D. The FIGS. include a sheet 700 and a stylus 705 (e.g., coupled to a robot arm). In FIG. 7B the stylus is applied to the sheet. The result is a deformation 710. FIGS. 7C and 7D illustrate larger deformations that result from the stylus being applied to different locations on the sheet (e.g., in a spiral pattern). To facilitate the deformation into a desired geometry (e.g., a cone), a second tool (e.g., coupled to a second robot arm) may be applied to the opposite surface of the sheet.

2. Controller and Model

The controller determines the process parameters to achieve the desired robotic forming operations. Parameters such as the path of the robotic forming tool during the process, its speed, geometry of the forming tool, amount of force, angle and direction of the forming tool, clamping forces of the sheet, etc. may have direct but nonlinear effects on the final geometry. The part forming process may include a set of time steps, where each step describes parameters values for one or more parameters. The part forming process may be iterative. Thus, by executing the system according to the parameter values at each time step, the controller may form the part described in the input design. The parameters values may be determined by the model.

The disclosed robotic system may achieve real-time adaptive control of a part forming process. The method may start with an input design of a part and a (e.g., statistical) model that is generated using a training data set. The training data set may include data from simulation data, and physical process characterization data (such as an in-process inspection or post-build inspection from previously formed parts or geometries). An in-process inspection may include inspecting a part during the forming process. For example, a scanning sensor records the shape of the part as it is being formed. In another example, an eddy current sensor detects defects like cracks. In another example, a force sensor measures the forces applied to the part. A post-build inspection is intended to gather information on a fully formed part. A post-build inspection may include similar inspection techniques as an in-process inspection (e.g., inspecting a part using a scanning sensor or eddy current sensor). However, a post-build inspection may include inspection techniques not performed while the part is being formed (e.g., due to practicality). For example, a fully formed part may be inspected using an x-ray machine.

Figure 2A:
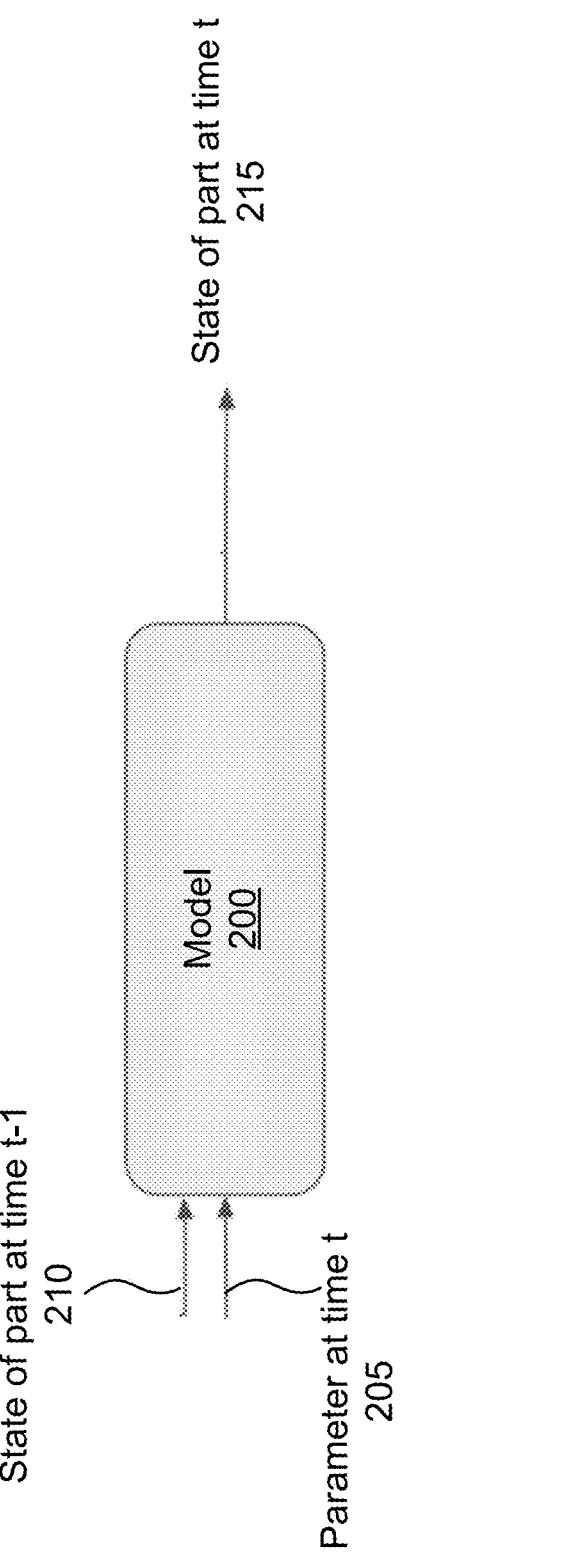
FIG. 2A is block diagram of a model, according to an embodiment.

FIG. 2A is a block diagram of an example model 200. As indicated above, the model may be a machine learned statistical model. The model receives one or more parameters 205 to be applied at time step t and the state 210 of the part at time step t−1. The state may refer to the geometry of the part. The model outputs the state 215 of the part at time step t. Thus, for a given state, the model can predict how the part will respond to the application of various parameters. More generally, the model may be used to predict how a material will deform when it goes through a programmed forming process (e.g., over multiple time steps)

A state of the part may be described by a mesh. The mesh may be a graph of coupled nodes, where each node represents a physical point of the part metal. Each node may be described by the following variables: X, Y, Z, F1z, F1x, F1y, F2z, F2x, F2y, thickness, dx, dy, and dz. X, Y, and Z represent the location of the node in space. Thickness indicates the sheet thickness at that node. Each node may be coupled to neighboring nodes (e.g., three neighbors). These coupled nodes represent the part in cartesian space. F1z, F1x, and F1y represent the force that one of the robots (e.g., robot 1) is applying at that node, and F2z, F2x, F2y represent the force another robot (e.g., robot 2) is applying at that node. Dx, dy, and dz represent the size of movements capable at a node if the robots pull back from the part at this time (e.g., they capture the elastic strain of the material).

The model can be used to determine the process parameters (e.g., in real time or offline). This method automates the generation of parameters for the robotic forming process (further described in the next paragraph). Due to the optimization process, the generated parameters may not be conceivable by engineers.

After the model is determined (e.g., by a training process), optimization techniques may be used to determine parameters to apply at each (e.g., time) step of the part forming process to create the intended part geometry. For example, for a given time step, the model is applied to various input parameter values according to an optimization technique to determine which parameter values will result in a desired geometry (or a geometry close to the desired geometry). Multiple optimization techniques may be used. Example optimization techniques include gradient descent, Adam optimization, and Bayesian optimization. An optimization technique may be chosen based on the complexity of the desired geometry. The optimization may be done both in the long and short horizons (e.g., time scales). The long horizon optimization may be done offline (before the part forming process begins) to determine steps of the process (e.g., step by step instructions for the robot to achieve the desired geometry). For example, a long horizon optimization may determine how to form a material sheet into a fully formed part. In some embodiments, long horizon optimizations determine a set of intermediate geometries that occur during a part forming process (e.g., intermediate geometries between the sheet and the fully formed part (e.g., for each time step or layer)). However, errors or inaccuracies may accrue over time (e.g., for processes with lengthy build times or processes with a large number of time steps). For example, the part may deform differently than the model predicted. To remedy this issue, short horizon optimizations may be performed during the forming process (online) to reduce or correct errors that may accrue. For example, the model is queried by a (e.g., online) controller that can modify (e.g., correct) steps determined during the long horizon optimization based on the current state of the sheet. For example, for a given time step, instead of assuming the part has a geometry predicted by the long horizon optimization, sensor data may be used to determine the actual geometry of the part. The model may then be queried to determine a new set of parameter values for the time step (or modify the long horizon parameters associated with the time step). For example, the model may be queried to determine which parameter values will form the actual geometry into the predicted geometry (or another intermediate geometry from the long horizon optimization).

While long horizon optimizations may be used to determine an entire part forming process or significant portions of the process, determinations made by short horizon optimizations may be limited to small portions of the part forming process. For example, a short horizon optimization determines a number of interactions (e.g., less than ten) between the end effector and the part. In another example, a short horizon optimization determines interactions between the end effector and the part that will occur during a time window (e.g., less than ten seconds). In another example, a short horizon optimization determines parameter values for a set of time steps (e.g., less than ten time steps). In another example, a short horizon optimization determines how to form a part in a first geometry into a second geometry, where the first and second geometries are intermediate geometries determined by a long horizon optimization. In another example, a short horizon optimization is used to determine how to form a part so that it is a threshold percent closer to a final geometry (e.g., less than ten percent).

In some embodiments, a long horizon optimization is used without short horizon optimizations (e.g., the model has a threshold accuracy or the part forming process has a short build time or a small number of time steps). In some embodiments, short horizon optimizations are used without a long horizon optimization.

Referring back to the model 200, the model may be trained using the data from a simulation module. Additionally, or alternatively, the model 200 may be trained using data (e.g., sensor data) from a physical process that forms a part.

In some embodiments, multiple models are trained. For example, models may be trained using different machine learning techniques. Additionally, or alternatively, models may be trained for specific materials (e.g., steel vs. aluminum), geometries (simple vs. complex), or sheet thickness (e.g., 1 mm vs. 2 mm). Among other advantages, models trained for specific specifications may be more accurate than a general model.

Figure 2B:
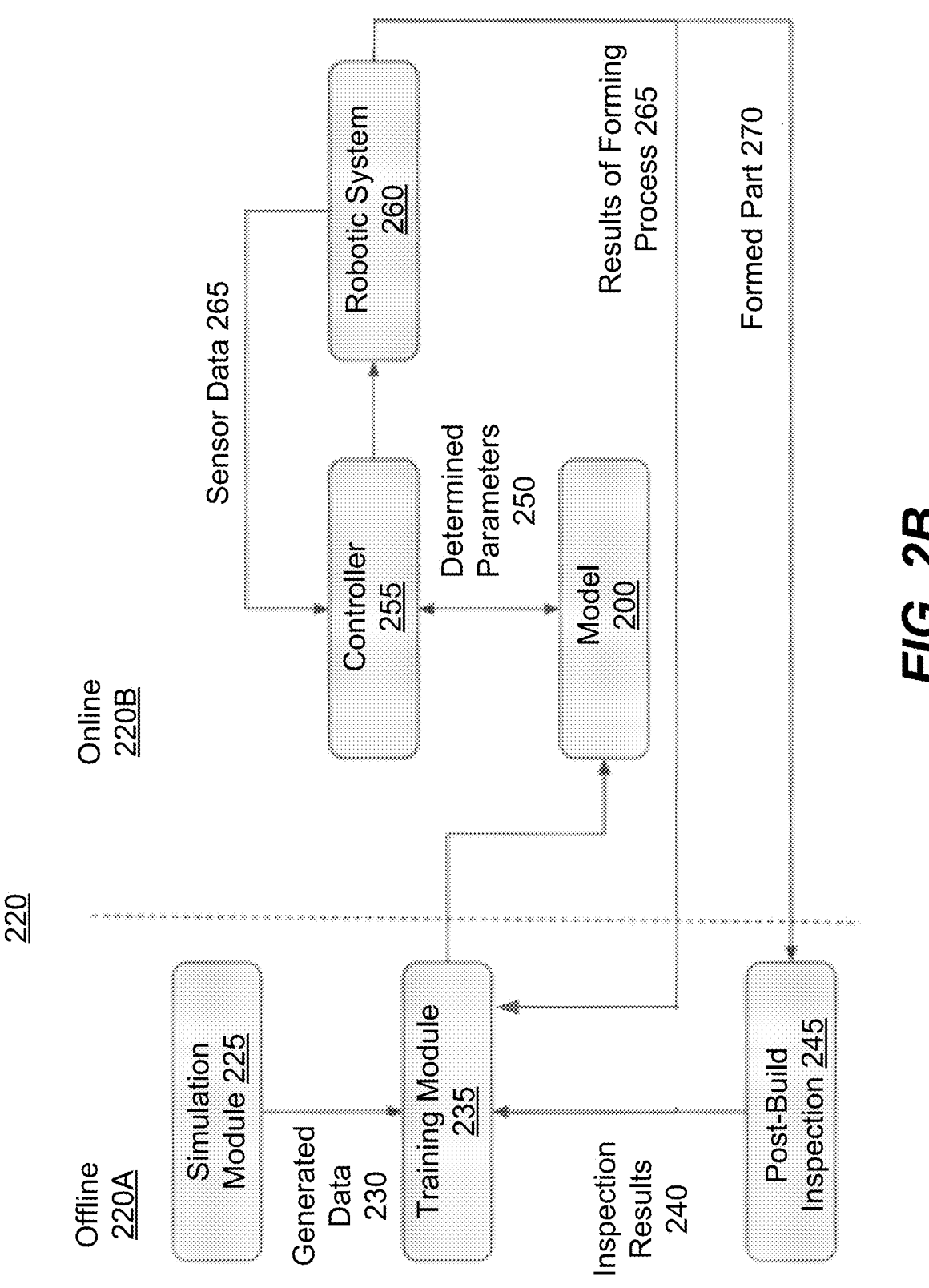
FIG. 2B is a block diagram of a part forming process, according to an embodiment.

FIG. 2B is a block diagram illustrating an example of the process 220. The process includes an offline learning process 220A and online process 220B. In this context, "online" refers to a time period when a part forming process is occurring (e.g., a robot is deforming a metal sheet to form a part), and "offline" refers to a time before or after a part forming process. The offline process uses simulation data 230, data 265 generated by an in-process inspection, and data 240 generated by a post-build inspection (of the formed part 270) to train model 200. Example data from an in-process inspection is metrology data. Example data post-build inspections includes geometry scans or X-rays of the finished part. After the model 200 is generated, it may be used to determine a part forming process.

The model 200 may also be applied by the controller 255 of the robotic system 260 in the online process. More specifically, the model 200 may determine predictions about the resulting change in geometry from each parameter change at each point in time in the part forming process. In the online process, the controller uses sensors installed on the robotic forming system to obtain sensor data 265 to determine a current geometry of the part. The current geometry may then be input to the model 200. The model predicts the outcome (e.g., a resulting change in geometry) of changes in those process parameters. By iterating over different possible parameters and their outcome predicted by the model, the controller identifies and chooses the (e.g., best) parameter 250 that produces the most desirable outcome to control the robotic forming system through a forming process that achieves the desired geometry. The controller uses the best parameters and may repeats this optimization cycle (e.g., in every step of the process) to improve the outcome.

In addition to the model 200 described above with respect to FIG. 2A, other models are possible. Two examples are provided below.

2.1 Blackbox Model

Figures 16A, 16B:
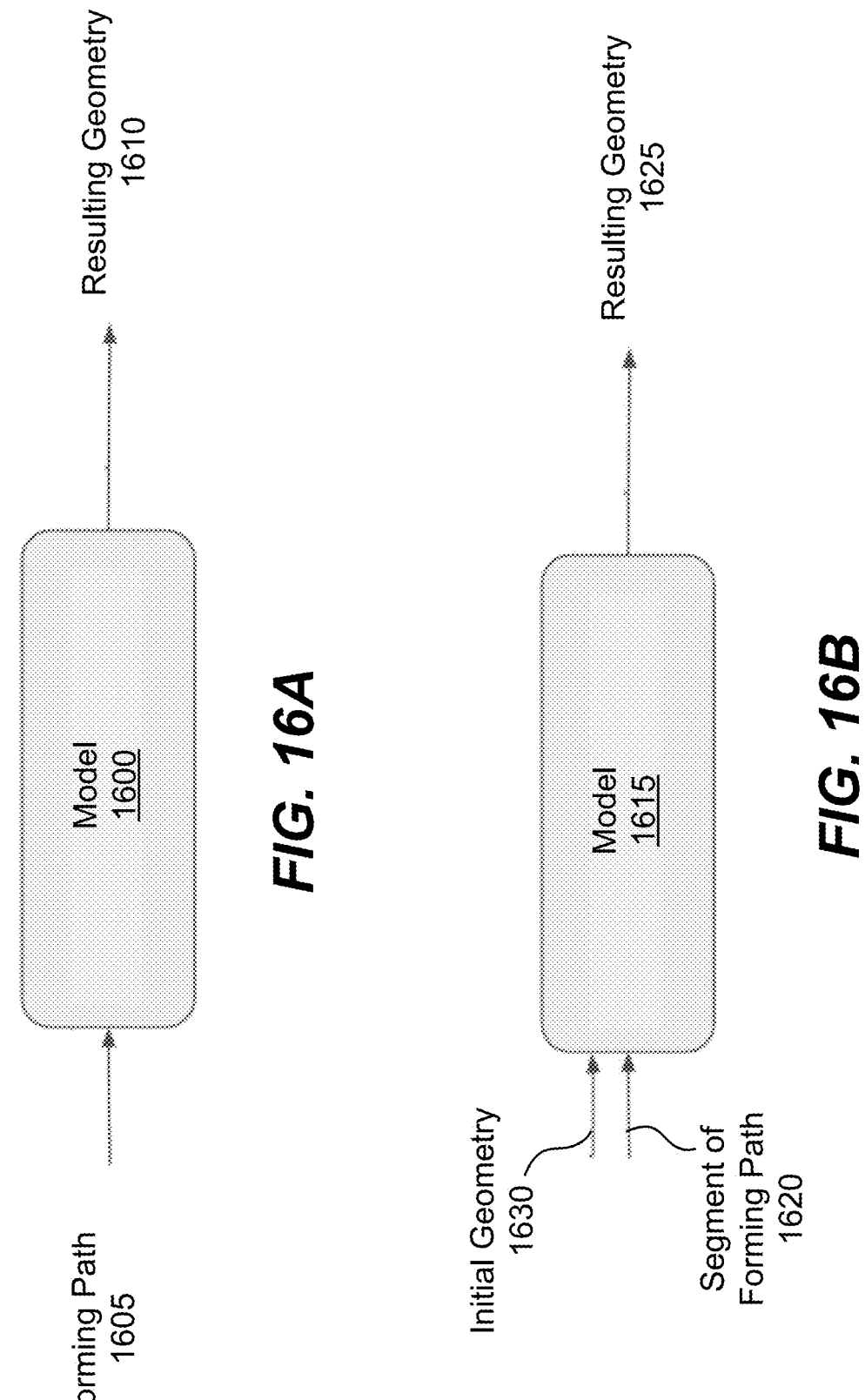
FIGS. 16A-16B are block diagrams of other models, according to some embodiments.

FIG. 16A illustrates an example black box model 1600. The model receives an entire forming path 1605 to be applied to a material sheet and outputs the resulting final geometry 1610 formed by the path. Thus, the model may be trained using data that describes various forming paths and the resulting part geometries. Since the model is not trained to account for physical phenomena (e.g., elastic deformation, global deformation, buckling) the model may be trained using large amounts of training data.

A more complex model is the one that breaks the forming process into layers and tries to predict the effect of various parameter values at each layer. In this context, "layer" refers to a section of a part. For example, a first layer refers to the section that extends one inch away from the original sheet and a second layer refers to the section that extends from the first inch to the second inch. An example of a layer based model is further described below.

2.2 Layer Based Model

FIG. 16B illustrates an example layer based model 1615. For input, the model receives a segment of a forming path 1620 and the initial geometry 1630 of a metal part (e.g., a sheet or other geometry). The segment of the forming path 1620 may include enough forming path to form a new layer of the part. The model outputs a resulting geometry 1625 (e.g., the geometry of the part with a new layer). Training data for this model may be generated by determining a forming path (e.g., set of parameter values) that formed a new layer of a part (e.g., scan every layer or every few layers).

Model 1615 may be developed as a sequence model which means it may be any of the sequence architectures (e.g., RNN, LSTM, Transformers). This model has more advantages than model 1600 since it is agnostic to general changes to the policy for forming robots. For example, model 1615 may be used to model inset adding or doing ADSIF or grouped DSIF. That being said, in some embodiments, model 1615 does not capture physical phenomena that may occur during each layer or group of layers.

3. Simulation

Referring back to FIG. 2B, the simulation module 225 simulates interaction of a robot-controlled tool, such as a stylus, with a sheet metal or other material. In one example, the simulation may be done using a finite element method. The simulation may be performed to generate simulation data indicating various input parameter values and resulting part geometries. The simulation may be replicated (e.g., in computer data centers) to generate large amounts of simulation data 230. The simulation speed and rate of data generation can be significantly enhanced using GPUs. The large amounts of data may be beneficial for training the model (e.g., instead of only relying on data generated from using a robot arm to physically deform a sheet).

Figure 3:
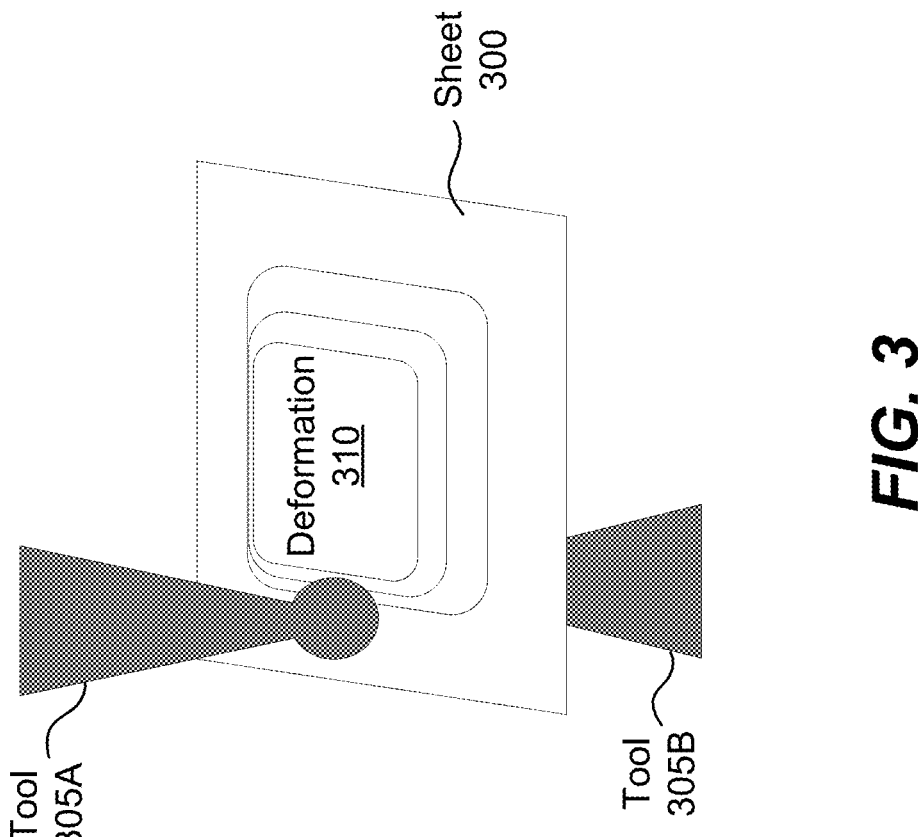
FIG. 3 is an image from a simulated part forming process, according to an embodiment.

FIG. 3 illustrates an example image from a simulation. The image includes a three-dimensional simulation of a sheet 300 and two tools 305A and 305B interacting with the sheet. The tools may be coupled to robot arms. Tool 305A is interacting with the top surface of the sheet, and tool 305B (partially blocked by the sheet) is interacting with the bottom surface of the sheet. The tools are pressing into the sheet to form a deformation 310. In the example of FIG. 3, the deformation is a rectangular hill protruding upward.

Referring back to FIG. 2B, input for the simulation module 225 may be a specification for a sheet, such as its material properties (e.g., the stress-strain curve) and failure criteria (e.g., mechanical failure of the sheet). Failure criteria may be one or more rules that specify when a part has torn or cracked. The criteria may be based on thickness of the sheet, the material properties, and the amount strain put into the sheet. The simulation module may also receive a specification for one or more programmed forming paths (e.g., determined heuristically) and the type and size of the end effector (e.g., stylus). The simulation module outputs, for a sequence of time steps of the programmed control process, the resulting formed geometry.

By varying different input process parameters such as the forming path, its speed, and the geometry being formed, the simulation module 225 can generate a (e.g., large) data set indicating how a specific metal is deformed with this process (e.g., how metal deforms in response to certain input parameters). The simulation data is used to train a model (e.g., by a training module). The model may be trained using one or more different machine learning techniques and constructs, such as Neural Networks, Random Forests, Decision trees, or regressions. In some embodiments, the training techniques are supervised learning techniques.

In some embodiments, the simulation data is used to train an initial model. The initial model may then be refined or retrained using data from physical part forming processes to increase the accuracy of the model.

In the examples described above, the model is generally described in the context of forming operations. However, the model (or another model) may be trained to predict other part operations, such as trimming or hemming.

4. Instrumentation of Robotic Part Forming

The model created using simulation data may be further trained from data derived from an actual physical process that uses a robot arm and an actual sheet. The physical system is equipped with one or more different types of sensors. Example sensors include: (1) encoders in the robot joints that provide positional information as determined by the position of the joints, (2) optical trackers (e.g., a camera) that track the location of robot in (e.g., 3D) space, (3) surface scanners to generate as-built geometry of the part before, during, and after the forming process (surface scanners may have a point accuracy of 0.5 mm), (4) load sensors that determine the force the forming end effectors apply on the sheet, (5) ultrasonic sensors (e.g., electromagnetic acoustic transducer or EMAT) for real-time monitoring of material thickness, and (6) eddy current sensors (e.g., pulsed eddy current) for real-time monitoring of the metallurgical state of metallic sheet. In some embodiments, if the surface scanner is attached to the robot arm, surface scanner data may be stitched together based on the encoder data to determine the geometry of a part (the location of the scanner depends on the position of the arm).

The encoders may be attached to each joint on the robot to track its actual movement, the optical trackers may be mounted around the manufacturing cell. This allows the optical trackers to capture images that include tracking targets installed on the robotic arms and the frame holding the sheet in place. The load sensor and scanner may be attached to the end-of-arm tooling to track forming forces and deformation of the sheet during the process.

Figure 4:
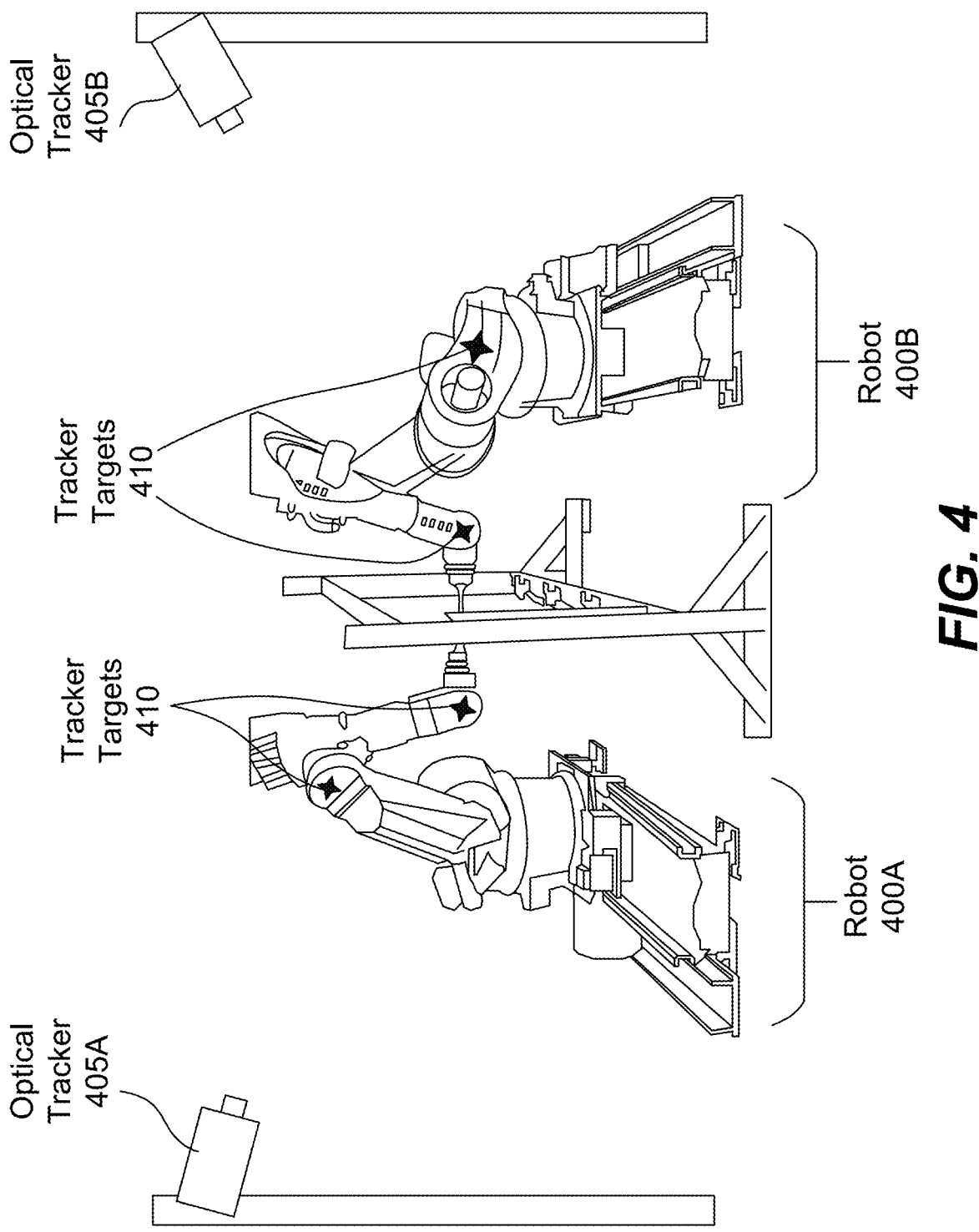
FIG. 4 is a perspective view of a robotic setup with optical trackers, according to an embodiment.

Example optical trackers are illustrated in FIG. 4. FIG. 4 includes two robots 400A and 400B in a manufacturing cell. FIG. 4 also includes two optical trackers 405A and 405B. The robots include tracker targets 410 located at various points on the robots. The optical trackers capture images of the robots and identify the locations of the tracker targets in the images. Thus, the locations of the robots in space can be determined. Although not illustrated, the sheet metal or frame may also include tracking targets to track locations of the robots relative to the metal sheet or frame.

Figure 5A:
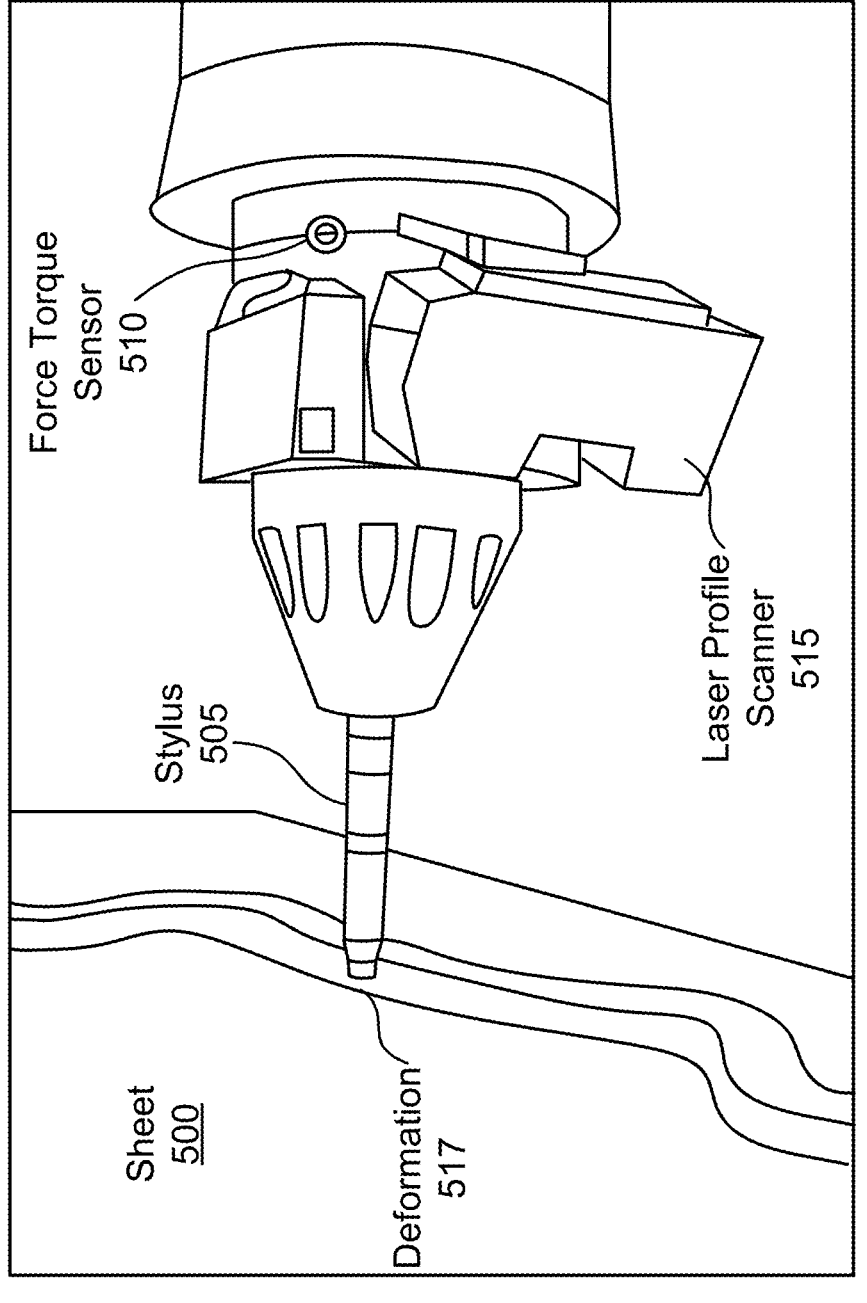
FIG. 5A is a perspective view of a robot arm with a scanner and load sensor, according to an embodiment.
Figure 5B:
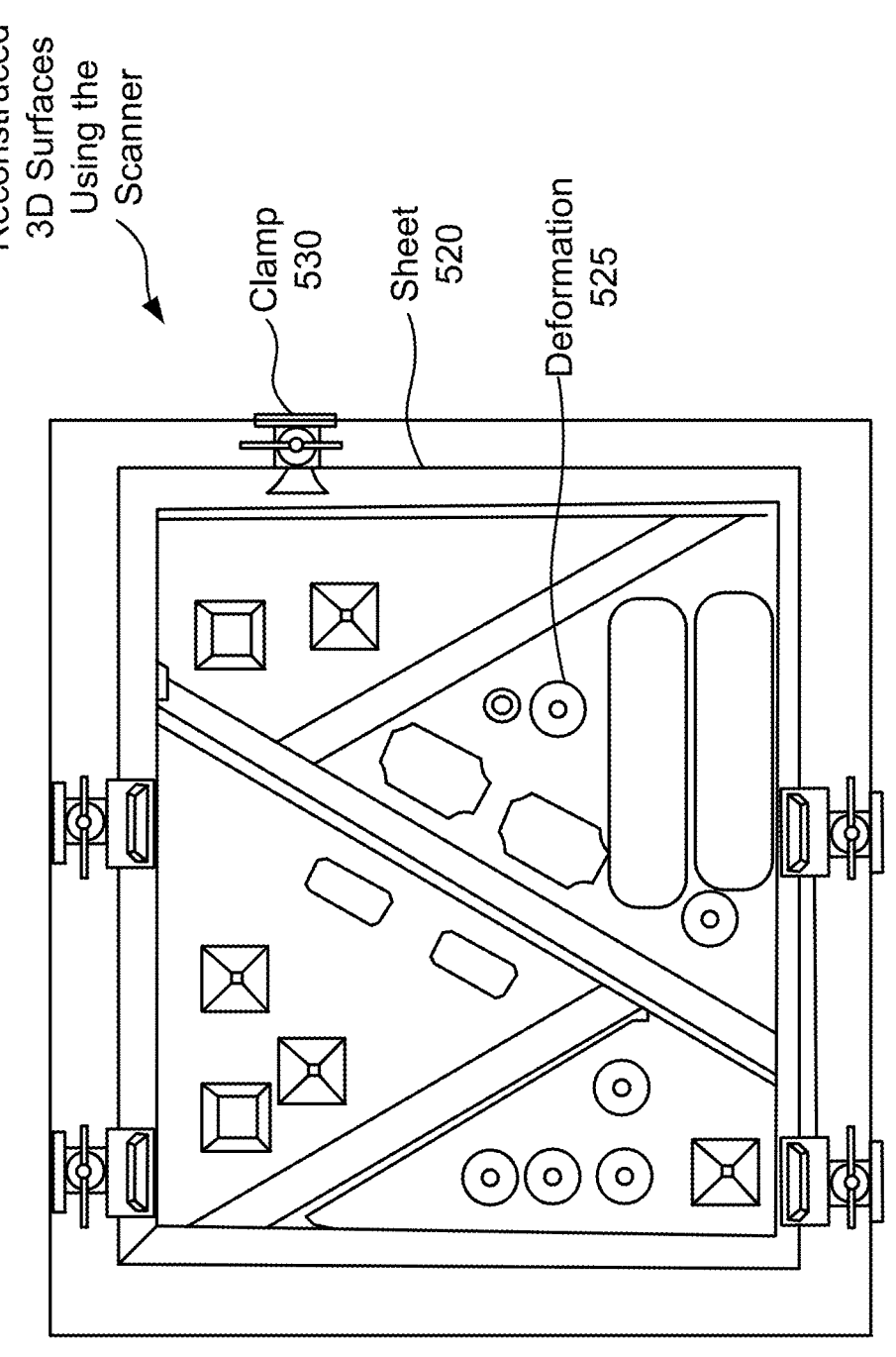
FIG. 5B is an image generated using scanner data, according to an embodiment.

In some embodiments, the robot arm is outfitted with a scanner and a load sensor (e.g., force/torque sensor) as illustrated in FIG. 5A. FIG. 5A illustrates a zoomed in view of an end of a robot arm. The robot arm interacts with a metal sheet 500 via a stylus 505 to create a deformation 517. The arm also includes a force torque sensor 510 and a laser profile scanner 515. FIG. 5B is an example image generated using data from the laser profile scanner 515. FIG. 5B illustrates a reconstructed three-dimensional surface of the metal sheet. The image includes clamps 530, a sheet 520, and deformations 525 in the sheet.

With the sensors described above, accurate data can be captured to characterize steps of a part forming process.

Referring back to FIG. 2B, the training module 235 obtains data 230 generated by the simulation module 225 (e.g., parameters and estimated final geometry of a part for a given forming process), sensor data 265 generated during a part forming process, and data 240 generated during a post-build inspection 245 (e.g., actual final geometry of the part). The training module 235 trains a machine-learned model 200 that maps input parameters to a resulting geometry.

5. Using the Model in Control Loop

Once a process model 200 is generated using the above-described training process, the model may be applied in the control process of the robotic forming in two ways. The model may as an input takes a specification for a sheet, such as its material properties (e.g., stress-strain curve) and failure criteria. It may also receive a specification for forming paths (which may initially be determined offline) and the type and size of the tool. The model can be either queried online for optimized process parameters for each time step of the process in real-time, or it can be used in the design of experiments offline to determine optimal policy for forming the part. The policy here refers to general pathing strategies in forming a part.

Figure 6:
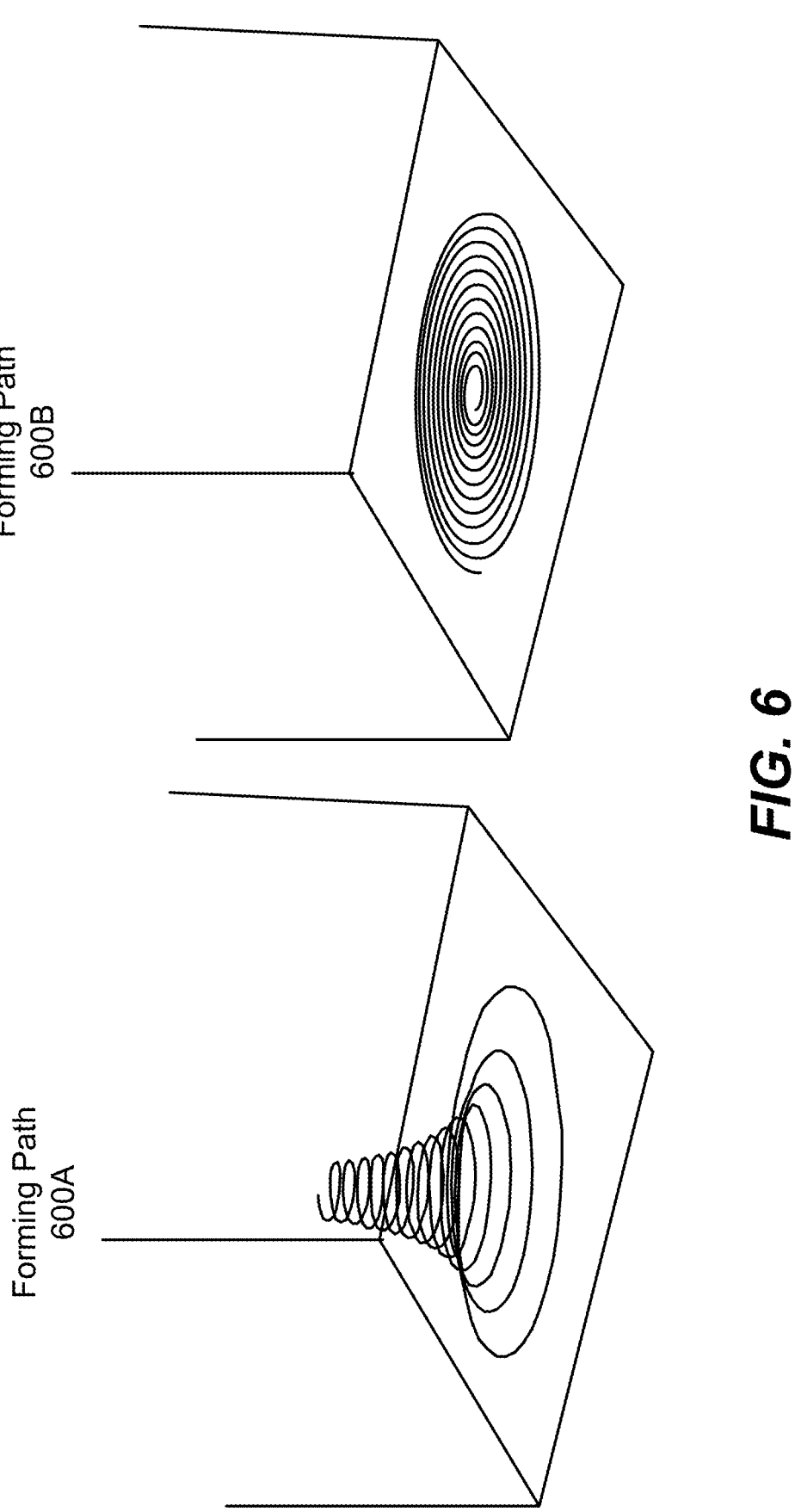
FIG. 6 includes plots of different forming paths to form a cone, according to an embodiment.

FIG. 6 illustrates two different strategies for forming a cone in an example forming process. Both can be evaluated (e.g., by the controller 255) using the machine-learned model 200 to determine a preferred path. The model can also be used (e.g., by the controller 255) to determine a combination of strategies for different locations in the part that might yield the best outcome. On the left side of FIG. 6 is a depiction of a forming path 600A that starts the forming from outside and moves in a circular pattern toward the inside of a cone (first forming the largest radius and then moving toward forming a smaller radii). On the right side of FIG. 6 is depiction of a forming path 600B that starts forming from inside and moves in a circular pattern toward the outside of a cone (first forming the tip of the cone with the smallest radius and then progressively forming larger and larger radii). The model can be used predict the outcome of both strategies to determine the best strategy or their combination for different parts.

Two categories of systems discussed below may increase the speed of sheet metal part fabrication using robots. The first system and design ("Forming With Rollers") increases the speed of the forming process itself, while the second ("Integration of Downstream Processes") addresses downstream processes from part forming to decrease total fabrication time.

6. Forming with Rollers

To increase the speed of the part forming process, an end-effector tool may be configured to interact with the sheet metal with reduced (e.g., low) friction forces. Reducing friction allows for reduction in vibrations in the sheet and hence allows increased speed of forming without negative impact on the geometrical accuracy of the formed part. It may also result in better surface quality (e.g., reduced tearing and galling) compared to tools not configured to reduce friction (e.g., static forming tools).

An example tool configured to reduce friction is a stylus made of a material (or coated with a material) configured to reduce friction. Thus, if the stylus is dragged across the surface of a part, the reduced friction may reduce or eliminate surface degradations and increase the path speed.

Figures 8A, 8B:
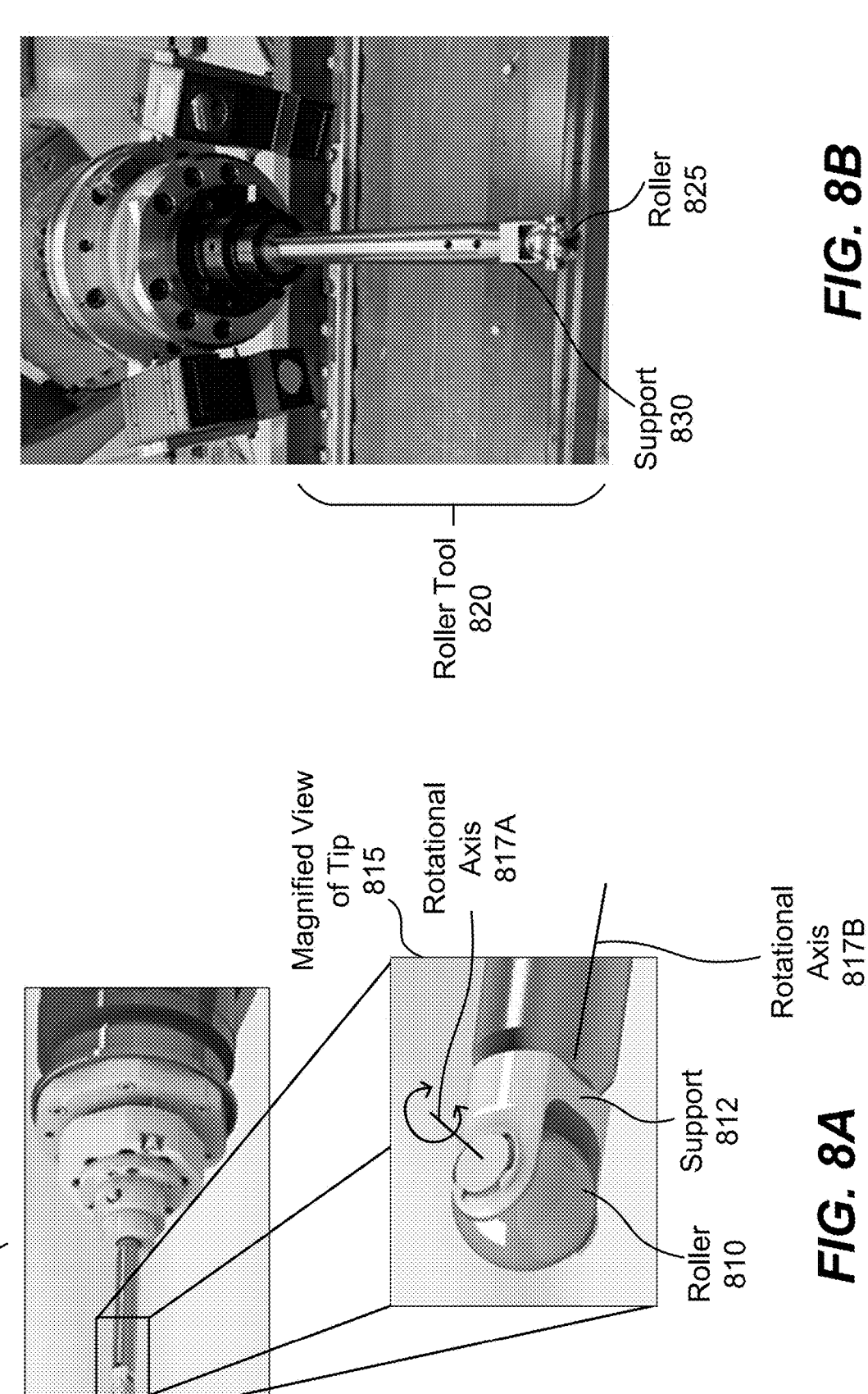
FIGS. 8A-8B are perspective views of first and second roller tools, according to some embodiments.
Figure 14:
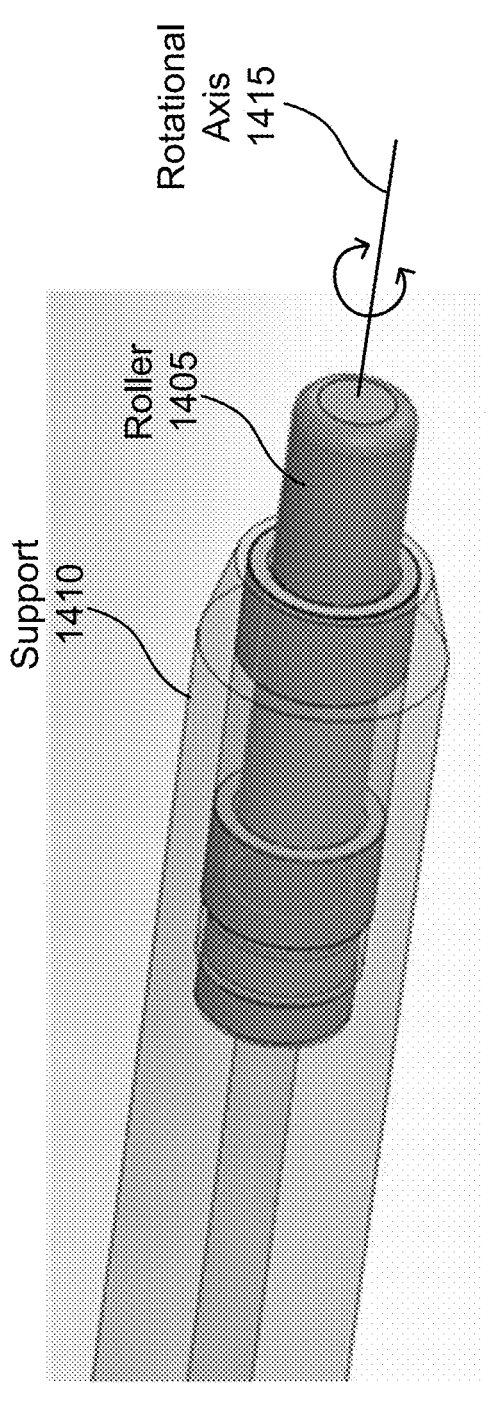
FIG. 14 is a perspective of fourth roller tool, according to an embodiment.

Other tools configured to reduce friction may include roller tools. Roller tools may result in lower friction forces than a stylus. Different rollers with different radii and shape can be used to accommodate for different features in the part design. FIGS. 8A-8B illustrate example embodiments of roller tools. FIG. 8A includes an image of a roller tool 805 coupled to a robot arm and a magnified view of the tip of the roller tool 815. The tip of the roller tool includes a roller 810 held in place by a support 812. The support allows the roller to rotate about an axis 817. FIG. 8B is an image of a larger roller tool 820. Similar to FIG. 8A, tool 820 has a roller 825 and a support 830. Another example of a single axis roller is illustrated in FIG. 14. The tool includes a roller 1405 with a support 1410. The roller can rotate about axis 1415, which is parallel to a long axis of the support.

In some embodiments, the roller can only roller about a single rotational axis (e.g., as in FIGS. 8A and 8B). However, the robotic system is controlled, via the controller, to orient the roller tool so that the roller rolls along the desired direction of movement (the desired direction of movement may be set by the program). Said differently, the roller tool may be oriented so that the rotational axis of the roller is perpendicular to the direction of movement of the roller tool. The illustrated rollers are specifically suitable for part forming with articulated 6-axis robots, since the robots can take advantage of the 6 degrees of freedom to align a roller in the direction of the movement during part forming. The roller may be held with the same mechanism as the stylus or other tools using a tool holder that is mounted at the end of the robotic arm.

Figure 13:
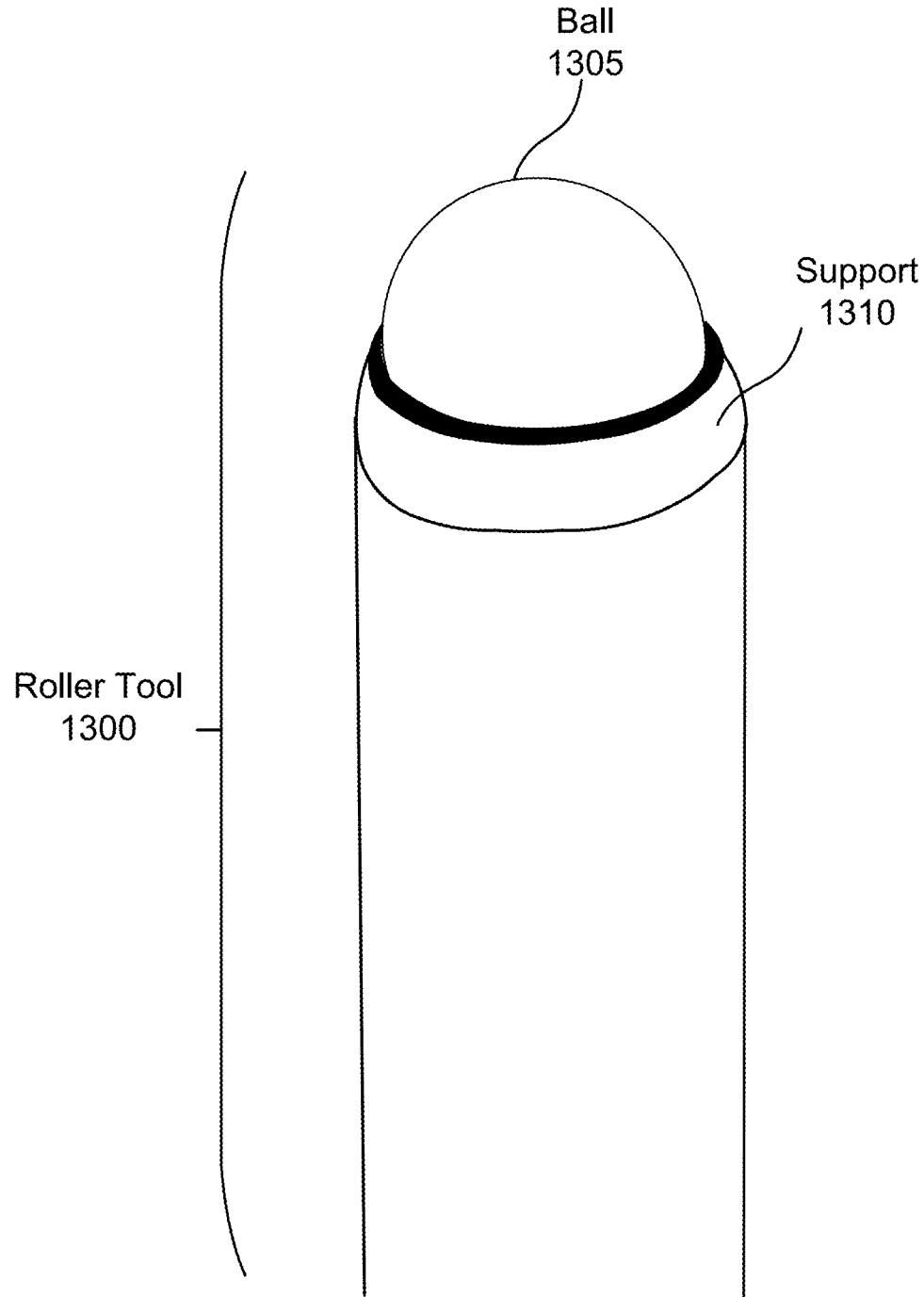
FIG. 13 is a perspective of a third roller tool, according to an embodiment.

In some embodiments, a roller tool includes a roller that can rotate about multiple rotational axes. An example, of this is illustrated in FIG. 13. FIG. 13 includes a roller tool 1300. The tool 1300 includes a ball 1305 in a socket that may be part of a support 1310 for the ball. The ball can rotate in the socket. Thus, the tool can move in different directions along a part surface without the robot rotating the support along the long axis. Due to the socket configuration, the roller tool 1300 may have less friction than a stylus but more friction than a single axis roller (e.g., as illustrated in FIGS. 8A and 8B).

The disclosed roller design installed on a robotic setup allows for robotic part forming with reduces friction, hence reduced forces which then allows for better surface quality of the formed part and increased speed of the forming process.

7. Integration of Downstream Processes in the Forming Setup

Sheet metal part forming may be one of many manufacturing steps performed to produce a final sheet metal part. For example, a sheet metal part also goes through trimming, hole making, hemming, or other processing steps after the part forming process. Traditional methods involve transferring a sheet metal part from one specialized manufacturing station to another, performing each manufacturing step in each corresponding station to produce the delivering the final part. This results in increased manufacturing time due to the time for physically moving the part from one station to another.

Each of the downstream processes generally has its own specific tooling. For example, for trimming a part, it is desirable to use a geometry specific frame that can hold the geometry of the part while a trimming operation is performed.

In some embodiments, the robotic system allows for performing two or more (e.g., all) downstream manufacturing steps in the same station using the same robotic setup, thus avoiding moving of the part and decreasing the total fabrication time. Each downstream process may use a different tool. For example, when performing trimming (e.g., hole making), the robot arm may attach different tools such as a spindle, laser, or a plasma torch. The robotic arm can be controlled to automatically change the tool through software instructions of the program executed by the controller (e.g., controller 255). For example, the controller can control the robot arm at varying times throughout the process to perform a programmed operation on the sheet metal with a particular tool, to control an actuator to release a tool from the tool holder (e.g., into a tool rack), and to cause the robot arm to attach a new tool from the tool holder (e.g., from the tool rack) for performing a subsequent operation.

In some embodiments, the steps that enable automatic integration of downstream processes in the same station may include the following. (1) the robot goes to a tool rack and picks up a forming tool (e.g., a stylus) using predefined software instructions sent to the robot. (2) the robot forms a part from a flat sheet of metal through software defined path and parameters. (3) After the part is formed, the robot moves back to the tool rack, disengages (e.g., drops) the forming tool, and picks up a trimming tool. This step may also be automated with software instructions. (4) The robot performs a trimming operation on the part with the trimming tool. If further downstream processes, such as hemming (e.g., bending), are used to finish the part, the system may continue from step 3 until no more processes are left to perform. If a station includes multiple robots, the robots may work in conjunction using the same or different tools to achieve a desired process (e.g., a forming or trimming process).

If a manufacturing area includes multiple cells (e.g., each including two robot arms), instead of each cell changing tools to perform different operations, each cell may be assigned to a specific operation. In these embodiments, a part may be moved from one cell to another after each operation on the part is complete.

FIG. 10 includes images of various manufacturing processes described above. FIG. 10A illustrates a robot arm 1000 forming a deformation 1005 by pressing a stylus 1010 against a piece of sheet metal 1015. FIG. 10B illustrates the robot arm 1000 with a trimming tool 1020. The trimming tool is used to cut a hole 1025 in a portion of the deformation. To determine the location of the hole, a controller of the arm (e.g., controller 255) may compare a design of the deformation (e.g., in a computer-aided design file) with the current geometry of the deformation (the current geometry may be determined from sensor data). For example, after the deformation is formed, the robot picks up a scanner sensor, scans the deformation and, based on a design of the deformation, determines the path to trim the deformation. After that, the robot may pick up a trimming tool. FIG. 10C illustrates the robot arm 1000 with a hemming tool 1030. The hemming tool is used to bend a corner of a part 1035. FIG. 10D is a perspective view of a tool rack 1040 holding a plurality of tools 1045. The rack may be placed near a robot arm (e.g., arm 1000) so that the arm can exchange tools. In the example of FIG. 10D, tools 1045A and 1045B are styli and tool 1045C is a roller tool.

8. Frame

Figure 9:
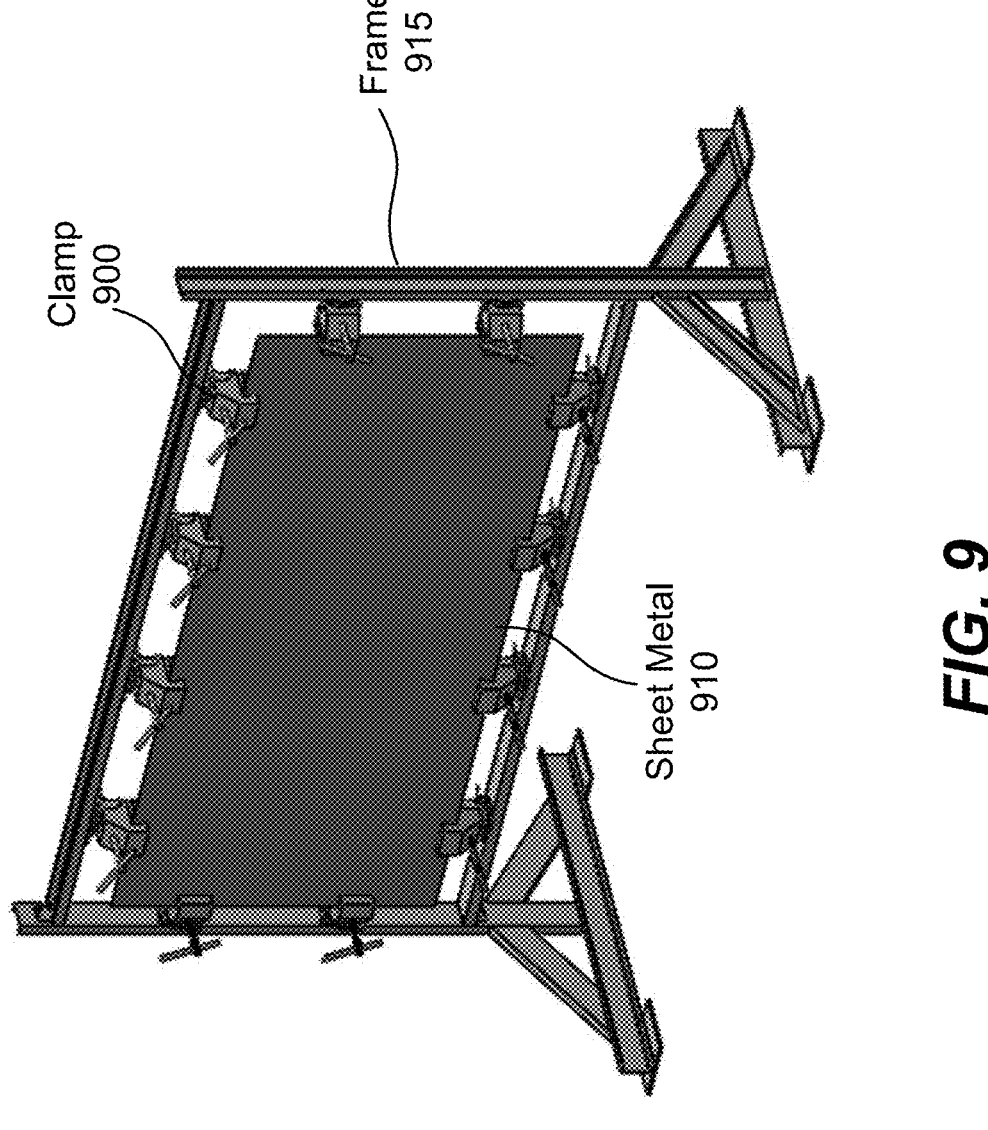
FIG. 9 is a perspective view of a frame holding a sheet, according to an embodiment.
Figure 10A:
FIG. 10A is a perspective view of a robot arm with a stylus performing a forming operation, according to an embodiment.
Figure 10B:
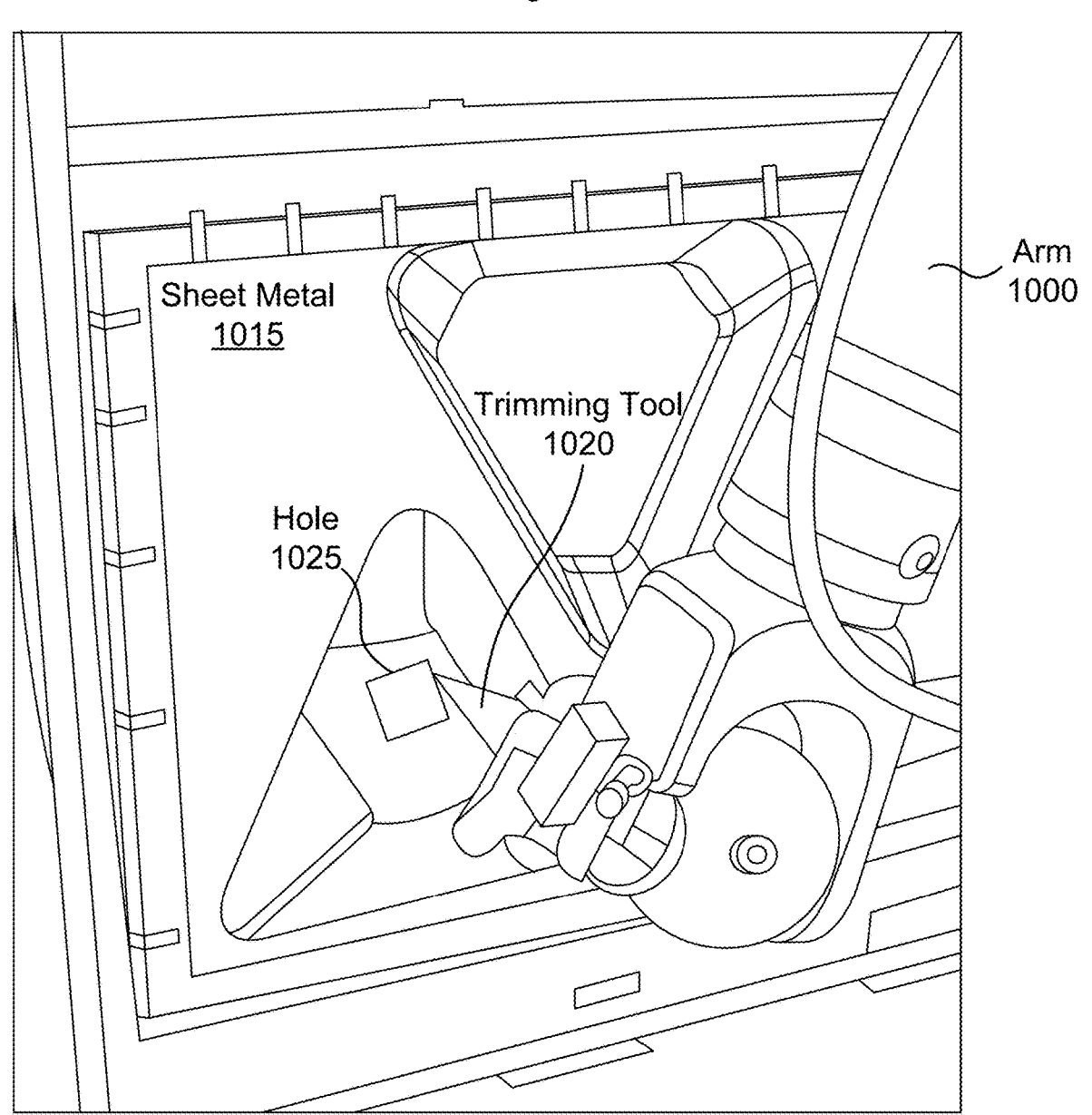
FIG. 10B is a perspective view of a robot arm with a trimming performing a trimming operation, according to an embodiment.
Figure 10C:
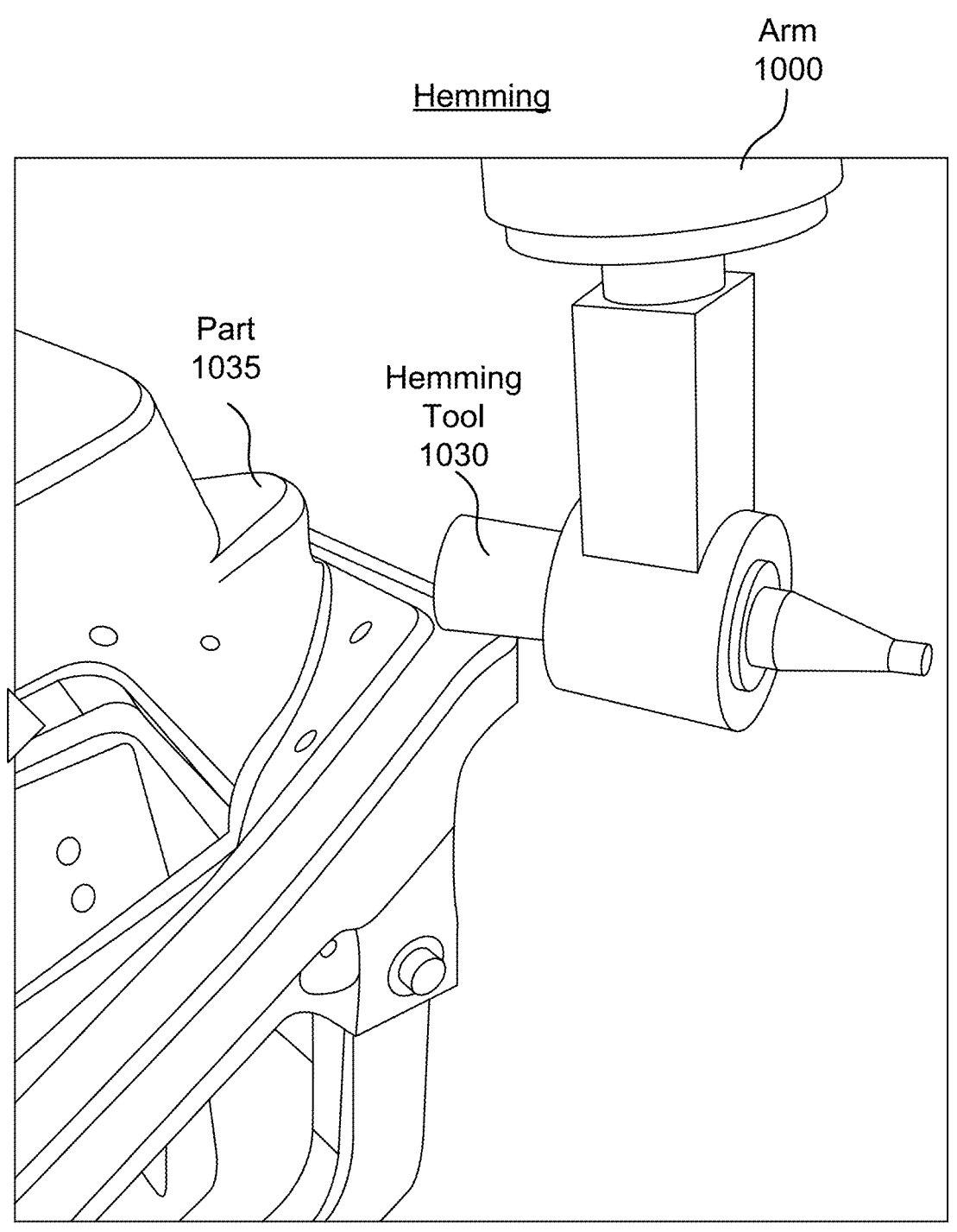
FIG. 10C is a perspective view of a robot arm with a hemming performing a hemming operation, according to an embodiment.
Figure 10D:
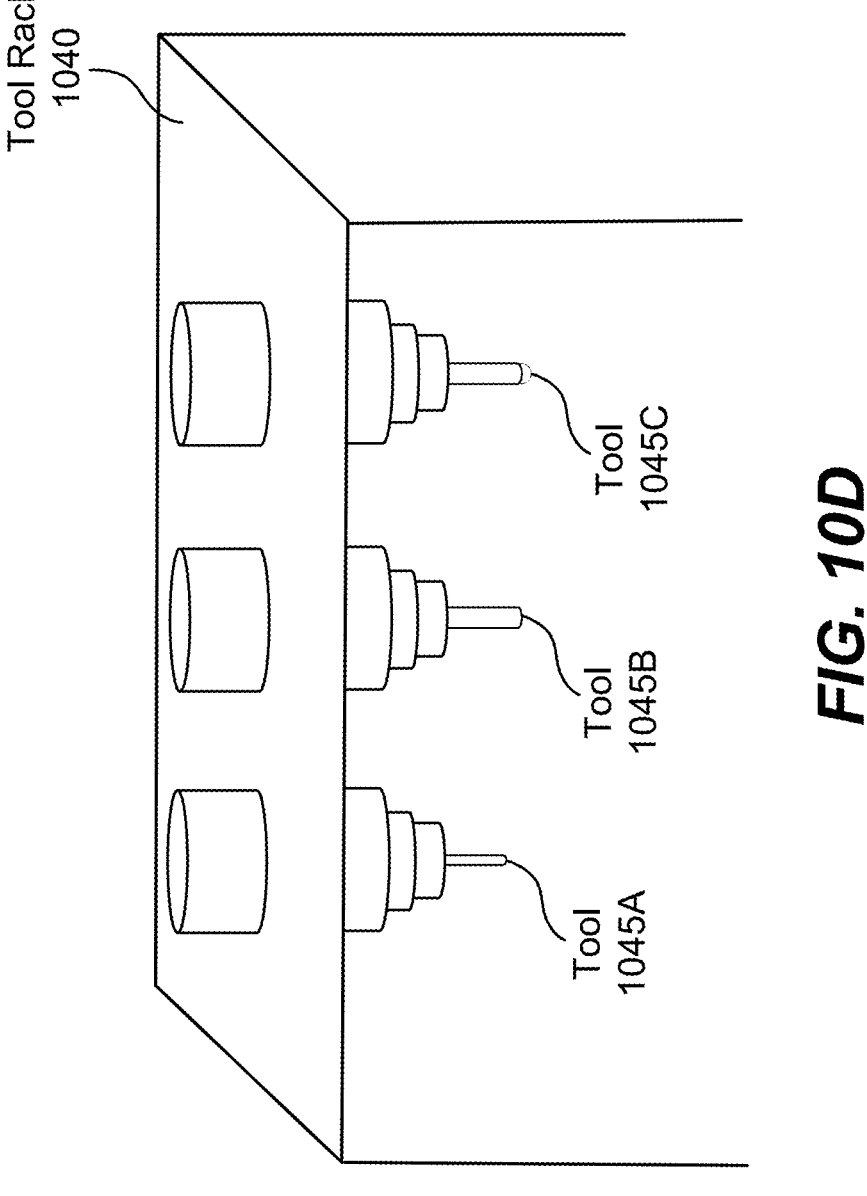
FIG. 10D is a perspective view of a tool rack holding a plurality of tools, according to an embodiment.

FIG. 9 is a perspective view of a frame 915 (also referred to as a fixture), according to an embodiment. In the example of FIG. 9, the frame 915 includes a series of clamps 900 that hold the sheet metal 910 in place. Specifically, the frame surrounds the edges of the sheet metal and the clamps are clamped to edge portions of the sheet metal 910. The clamps may be hydraulic or electric (e.g., servo). The clamps may be electronically operated. The frame and clamps may be sturdy enough to hold the sheet metal in place as the robot arms apply different processes (e.g., deformation forces) to the sheet. The frame enables access to large sections of the sheet metal 910 with robotic arms. Thus, it may eliminate the need for any method-specific modification in the fixture that is traditionally required with downstream operation from sheet forming.

Thus, the stand design and software-controlled tool changer for controlling the robotic arms allows for automated downstream operations from forming of the sheet metal parts such as trimming, bending, and hemming without removing the part from the fixture and requiring geometry specific fixture.

9. Ultrasonic Vibration System

In some embodiments, a flexible manufacturing system selectively and precisely treats certain regions of a (e.g., geometrically complex) metal part to modify its material properties, such as hardness. The system and process can reduce reliance on geometry specific tooling relative to conventional techniques, thereby reducing the cost and timing for manufacturing (e.g., sheet) metal parts. The described system and process achieves these outcomes without substantially raising the temperature of the part.

Embodiments may utilize ultrasonic vibrations, delivered through industrial robotic arms and industrial controls, to enable high precision conditioning of metal parts to deliver high performing parts at lower fabrication time and cost. Ultrasonic vibrations in include vibrations with frequencies in the range of twenty kHz to three gigahertz. The vibrations can treat a region at room temperature and the vibrations may change the temperature of the region by less than 10° C.

The disclosed surgical metal conditioning technology (SMCT), enables similar or better, strengthening results compared to traditional heat treatment methods without the need to raise the temperature and without its respective side effects. The ultrasonic vibration system may include a robotic kinematic system, an ultrasonic end effector, process monitoring sensors, and a controller. In some embodiments, the ultrasonic system has a small spatial footprint that allows its easy integration with existing production lines in metal manufacturing. It can also be used with emerging fabrication methods like additive manufacturing to help with wider adoption of these new technologies through delivering desired properties in feedstock and final part.

9.1 Components of Ultrasonic Vibration System

Figure 11:
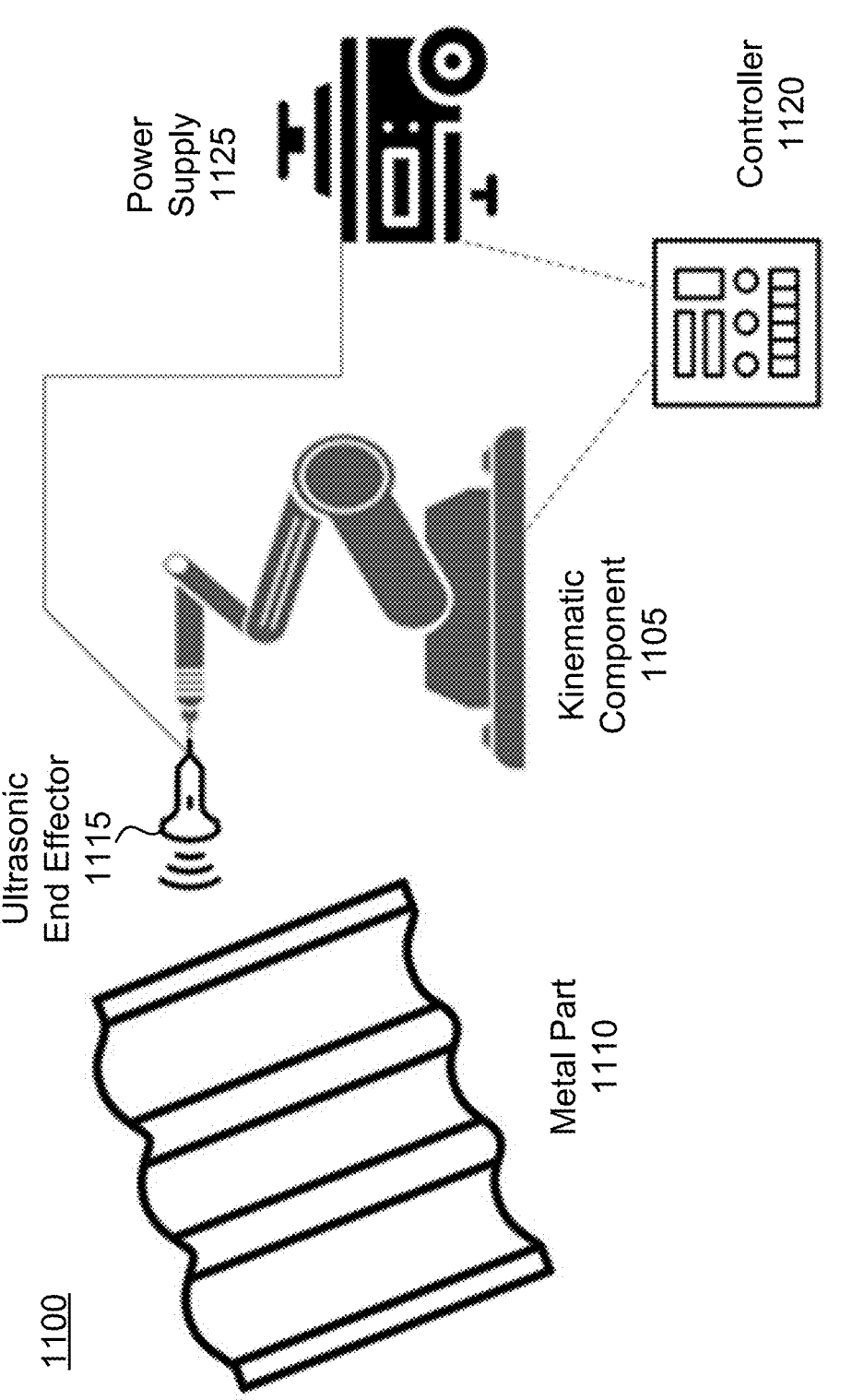
FIG. 11 illustrates components of an ultrasonic vibration system, according to an embodiment.

The system 1100 may include four components as illustrated in FIG. 11. A kinematic component 1105 (e.g., an industrial robotic system) has the ability to reach different areas of a (e.g., complex) metal part (e.g., via programmatic software interface). An ultrasonic end effector 1115 (e.g., an ultrasonic transducer) coupled to the kinematic component can deliver ultrasonic vibrations to the metal part with tuned parameters (e.g., power, frequency, time of treatment, and the angle of end effector). The kinematic component may have a small form factor so that it can be coupled to (e.g., attached to or installed on) an end of the kinematic component (e.g., an end of a robotic arm) and moved with precision in space. A controller 1120 (also referred to as a control unit) enables control over process parameters such as travel, speed, power, and frequency. Process monitoring sensors evaluate the result of the treatment and actively control the process. The components of the system 1100 are described in further detail below.

9.2 Robotic System

Articulated robots may be used as the kinematic component 1105. The industrial robots may provide broad movement range, flexibility, and small footprint. They allow for precise delivery of ultrasonic treatment to the intended area of the part. The robotic cell includes one or more heterogeneous, 6-axis robots mounted on linear tracks and a real-time monitoring and control system. If the cell includes multiple robots, the robots may work in coordination with each other to deliver ultrasonic treatment to different areas of the part (e.g., based on an input CAD file). The controller 1120 may monitor the treatment operation in real-time and assesses its effect against the desired treatment. The feedback may be actively used to update the robotic movement.

9.3 Control System

The controller 1120 obtains the geometry of the part 1110 and signals from various sensors installed on the robot or the part. The robot (e.g., 1105) is controlled to interact with the part in accordance with a program applied by the controller to result in a desired geometry. For example, the program controls the robot arms to move in a particular sequence (e.g., along a predefined path) and apply the ultrasonic end-effector to the part according to particular programmed parameters at each step of the sequence. The controller 1120 may be coupled to a power supply 1125 with knobs or automated software controls to control the frequency and the power of ultrasonic vibrations in real time through a software interface. For example, the controller may control a frequency, amplitude, or other operational parameters of the ultrasonic end-effector to achieve a desired material property at different locations on the part. As previously described, the program may also cause the robot to utilize other tools to bend, pinch, cut, heat, seam, or other form the metal in accordance with the program. During the part forming process, the controller may receive and process sensor data from the sensors to determine the proper joint values for each axis in the robotic arm, the ultrasonic end-effector parameters, or other operational parameters, to control the robot arms and end effector accordingly. For example, the sensors may sense the hardness and, based on the sensor data, the controller may control the ultrasonic end-effector (e.g., ultrasonic parameter values) to achieve the programmed hardness.

Depending on the ultrasonic parameter values and the material of the part, the vibrations may harden or soften a region of the part. For example, with 7xxx aluminum, low power ultrasonic vibrations can harden the metal, but if the power is increased above a threshold level, the vibrations will heat the meal, which anneals (softens) the material.

9.4 Ultrasonic End-Effector

The ultrasonic apparatus or end-effector 1115 is a tool attachable to a tool holder of the kinematic component 1105. The ultrasonic end effector may include piezoelectric disks, front mass, back mass, ultrasonic horn, fixtures, and frames. It can deliver a wide range of power and frequencies to the part 1110. Different designs of the ultrasonic horn and coupling element also allows for a controllable treatment footprint.

Figure 12:
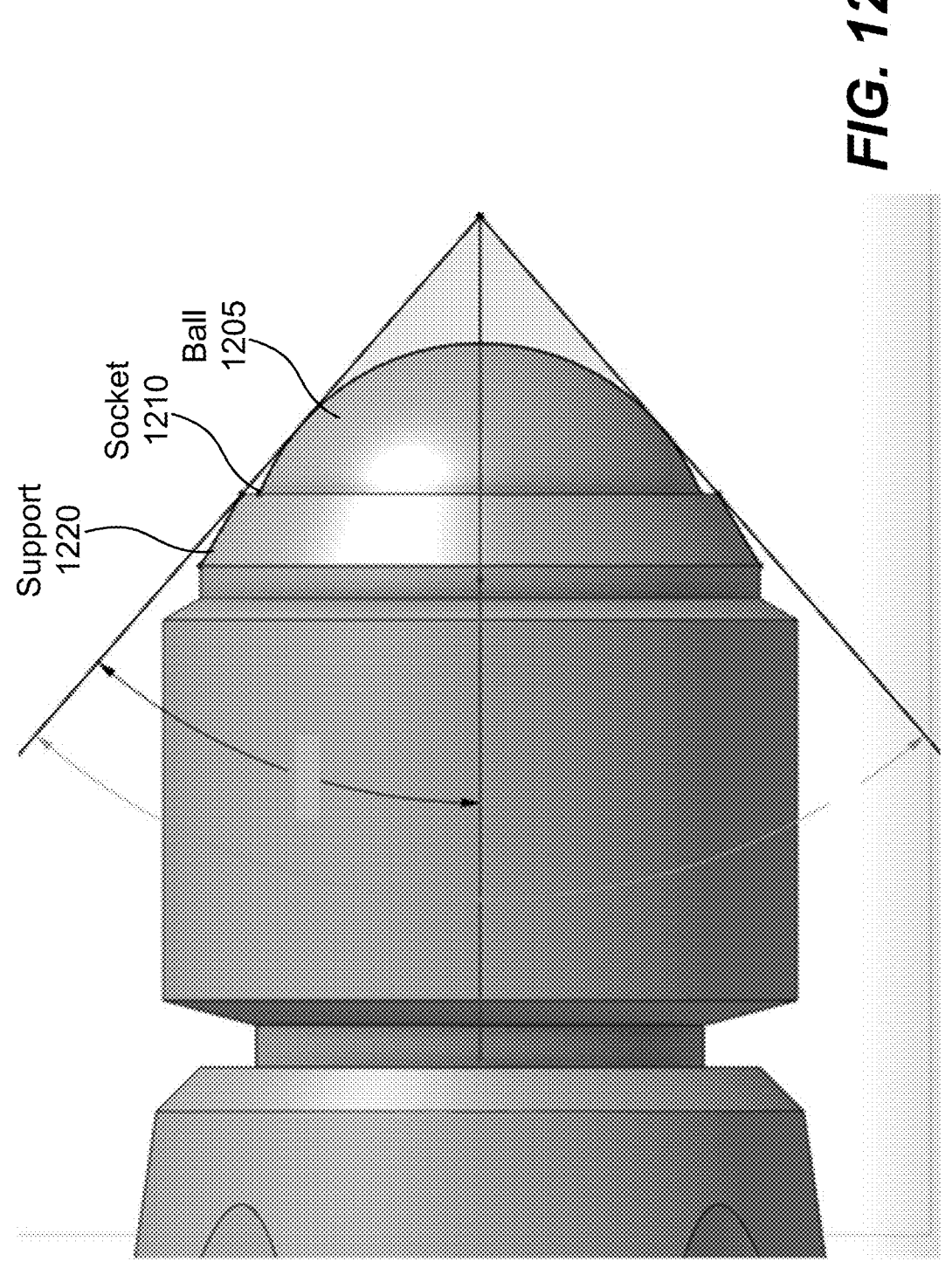
FIG. 12 is a side view of an ultrasonic end effector, according to an embodiment.

Generally, the ultrasonic end effector includes a transducer that vibrates a component to apply vibrations to a region of a part. FIG. 12 illustrates and example ultrasonic end effector 1215. The end effector 1215 includes a ball 1205 in a socket 1210 formed by a support 1220. Although not illustrated, a mechanical transducer is located in the socket. The transducer can vibrate the ball. Thus, ultrasonic vibrations may be delivered to a local region by pressing the ball against the part without affecting other regions of the part. The diameter of the ball may determine the size of the treatment region. For example, the end effector can apply vibrations to a region with a diameter of a quarter of an inch. Other end effector configurations, such as different size balls, may enable smaller or larger regions to be treated with vibrations. Although the example of FIG. 12 includes a ball in a socket, other configurations are possible. For example, an ultrasonic end effector may include a component with a rounded surface (or another shaped surface) that is coupled to a transducer.

9.5 Process Monitoring

Process monitoring includes sensors that can measure ultrasonic vibration and temperature in the part and end effector. For example, thermocouples and thermal cameras can detect the temperature and the ultrasonic vibration can be measured through the power supply 1125. The sensors may also include, for example, accelerometers, gyroscopes, pressure sensors, or other sensors for detecting motion, position, and interactions of the robot with the sheet metal.

9.6 Process Description

In an example process, the process starts by identifying the local areas (also referred to as sections or portions) of the metal part 1110 with properties that are programmed to be changed in accordance with a desired final part. These areas may be based on the properties desirable for downstream operations like forming, machining, etc. For example in order to stretch certain areas in a later forming operation, those areas may be softened via ultrasonic vibrations. The control unit 1120 generates commands for the robot to bring the ultrasonic end effector 1115 near the identified region. The control unit will then command the power supply 1125 to power up the end effector to the frequency and power that generates the desired properties in the material. These frequency and power values may be determined using empirical and machine learning models built through design of experiments done previously. The design of the experiment may also determine the time of treatment and the angle of end effector. The time and angle are enforced through commands sent by the controller to the robot to align the end effector and movement at the correct speed so each area gets the appropriate amount of treatment for the desired effect.

10. Roller Tool End Effectors

The following paragraphs describe various roller tool end effectors.

Figures 17A, 17B, 17C:
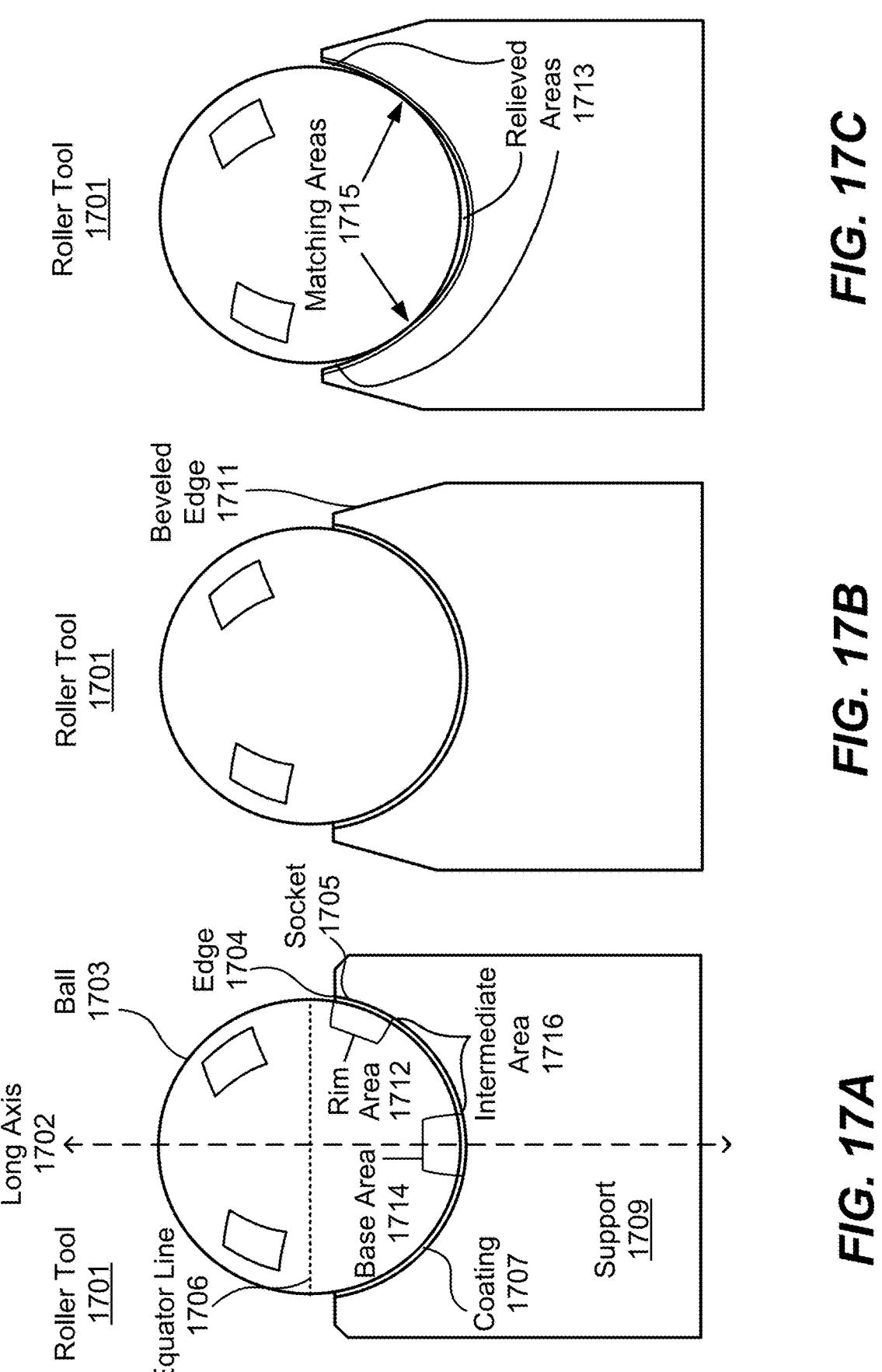
FIG. 17A is a diagram of a roller tool with a ball in a socket of a support, according to one or more embodiments.
FIGS. 17B-17S are example diagrams of different embodiments of the roller tool in FIG. 17A.

FIG. 17A is a diagram of a roller tool 1701 with a ball 1703 in a socket 1705 of a support structure 1709, according to one or more embodiments. In some embodiments, the support 1709 is a rod and the socket 1705 is a concave portion of a sphere (e.g., hemisphere) machined in one end of the support 1709 to accommodate the placement of the ball 1703. The support 1709 and/or ball 703 may be made of any suitably hard material, such as metal (e.g., steel), carbide ceramic, or some combination thereof to form a part. As previously discussed with respect to other roller tools (e.g., the description with respect to FIG. 13), the ball 1703 can rotate in the socket 1705, the support 1709 is held by a robot (e.g., 100A or 100B), and the ball 1703 may be forcefully applied to a part to form it into a desired geometry.

The socket 1705 includes a base area 1714, a rim area 1712, and an intermediate area 1716. The base area 1714 is the bottommost area of the socket 1705, which is the deepest region of the socket. The rim area 1712 is an area adjacent to the edge 1704 of the socket 1705, and the intermediate area 1716 is the area between the base area 1714 and the rim area 1712. The base area may correspond to latitude angles of 50-90 degrees (of the socket), the intermediate area 1716 may correspond to latitude angles of 30-50 degrees, and the rim area may correspond to latitude angles of 0-30 degrees. However, the specific angles for each of the areas depends on the embodiment of the socket 1705, such as the shape and depth of the socket 1705. Various retention methods may be employed to keep the ball 1703 within the socket 1705. For example, the ball 1703 may be retained by friction, fluid pressure, electromagnetic force, surface tension, or some combination thereof.

In some example roller tools, the socket is deep enough that an edge (e.g., 1704) of the socket substantially aligns with the equator line (e.g., 1706) (also "center line") of the ball (e.g., 1703) when the ball is in the socket (e.g., the edge 1704 is aligned with latitude angles of 0-5 (inclusive) degrees of the ball). However, this is not required. Depending on the one or more ball retention methods used, the edge (e.g., 1704) may be below or above the ball equator line (e.g., 1706) when the ball is in the socket (e.g., the edge 1704 aligns with latitude angles of 5 (exclusive)-40 degrees of the ball).

In one embodiment, the roller tool 1701 includes a coating on the surface of the socket 1705 that contacts the ball 1703. The coating 1707 may reduce friction between the ball 1703 and the socket 1705, allowing the ball 1703 to rotate smoother inside the socket 1705. The coating 1707 may also reduce wear. An example coating 1707 is a low friction permanent coating (e.g., RED), such as a diamond-like coating (DLC). Additionally, or alternatively, the roller tool 1701 may include a lubricant (not illustrated in FIG. 17A). The lubricant may reduce friction between the ball 1703 and the socket 1705. The lubricant may also provide passive ball retention.

Figure 17E:
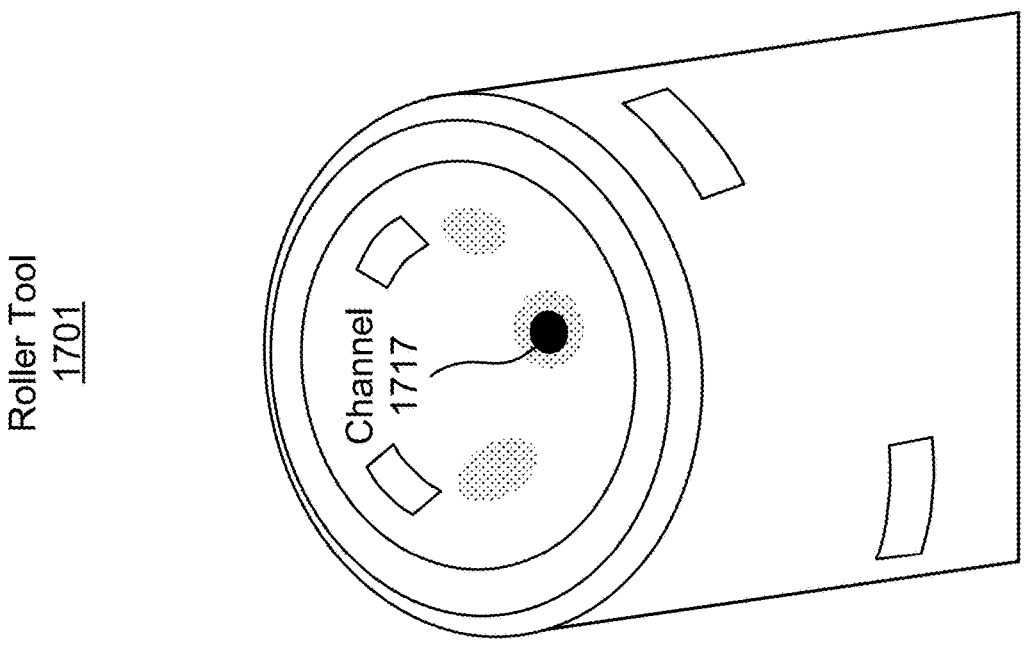
Figure 17D:
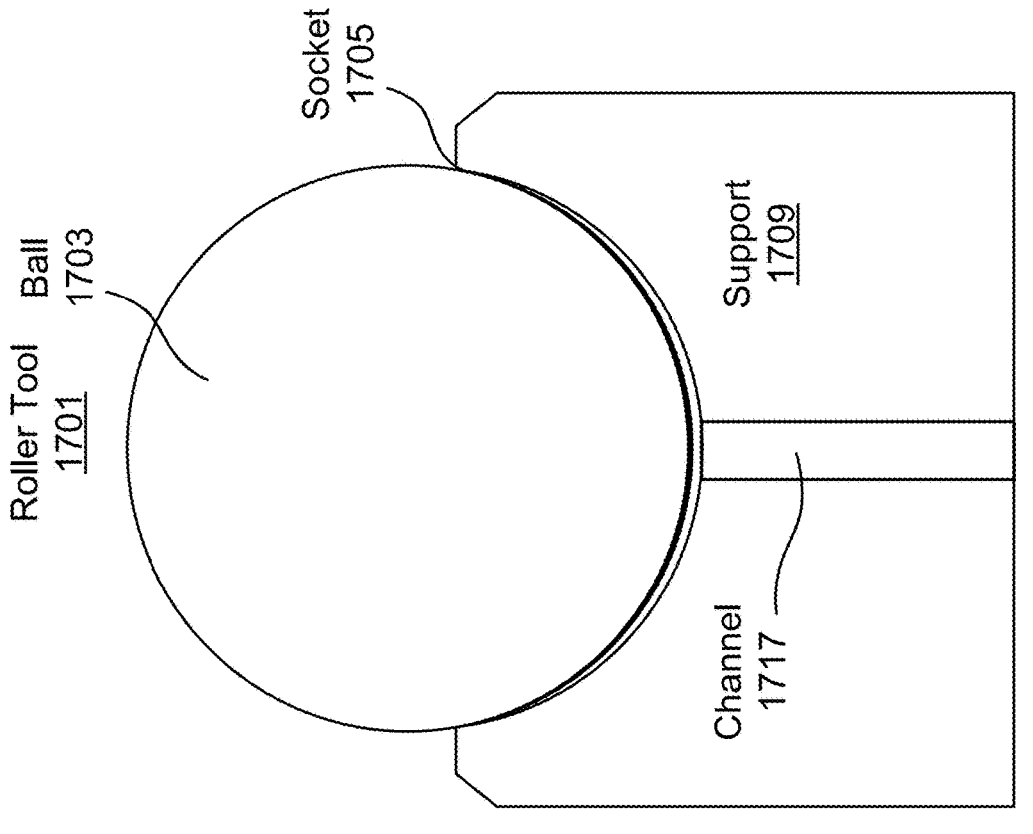
Figure 17G:
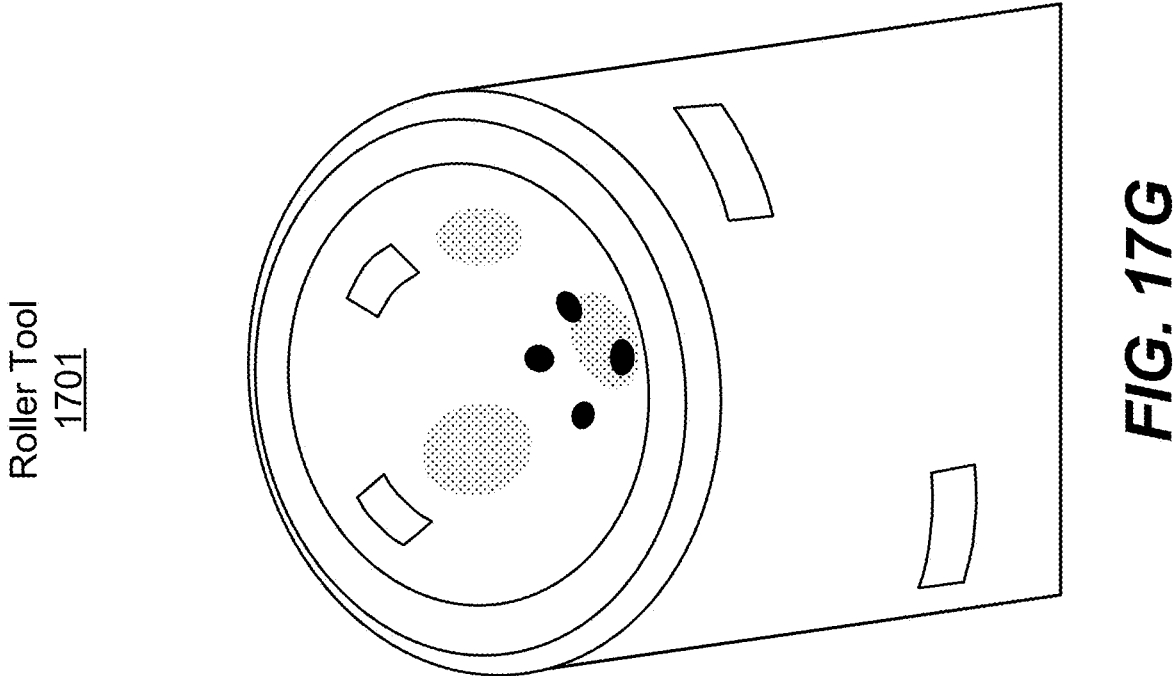
Figure 17F:
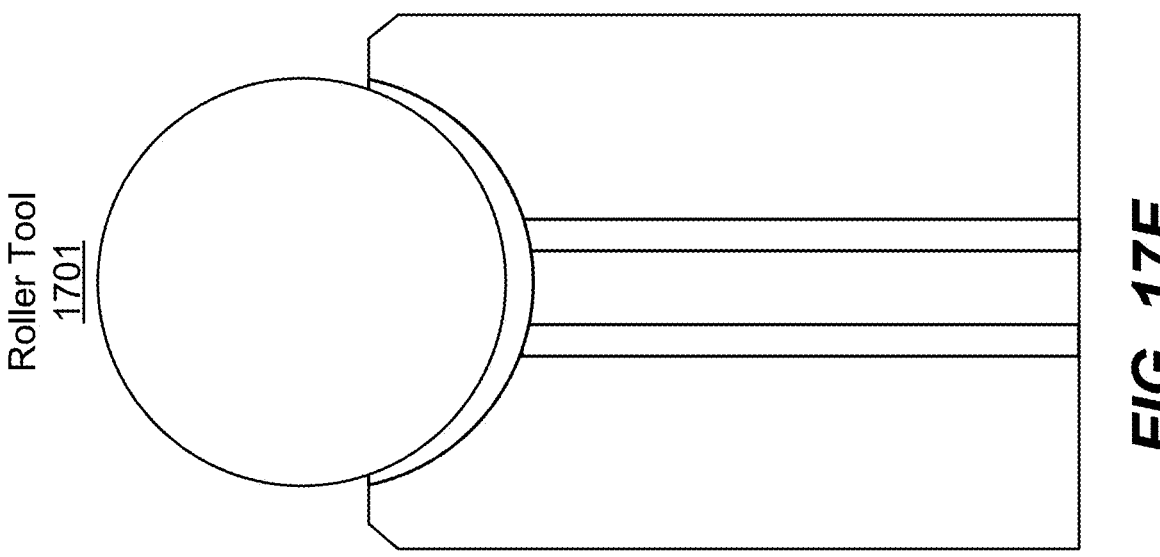
Figures 17H, 17I:
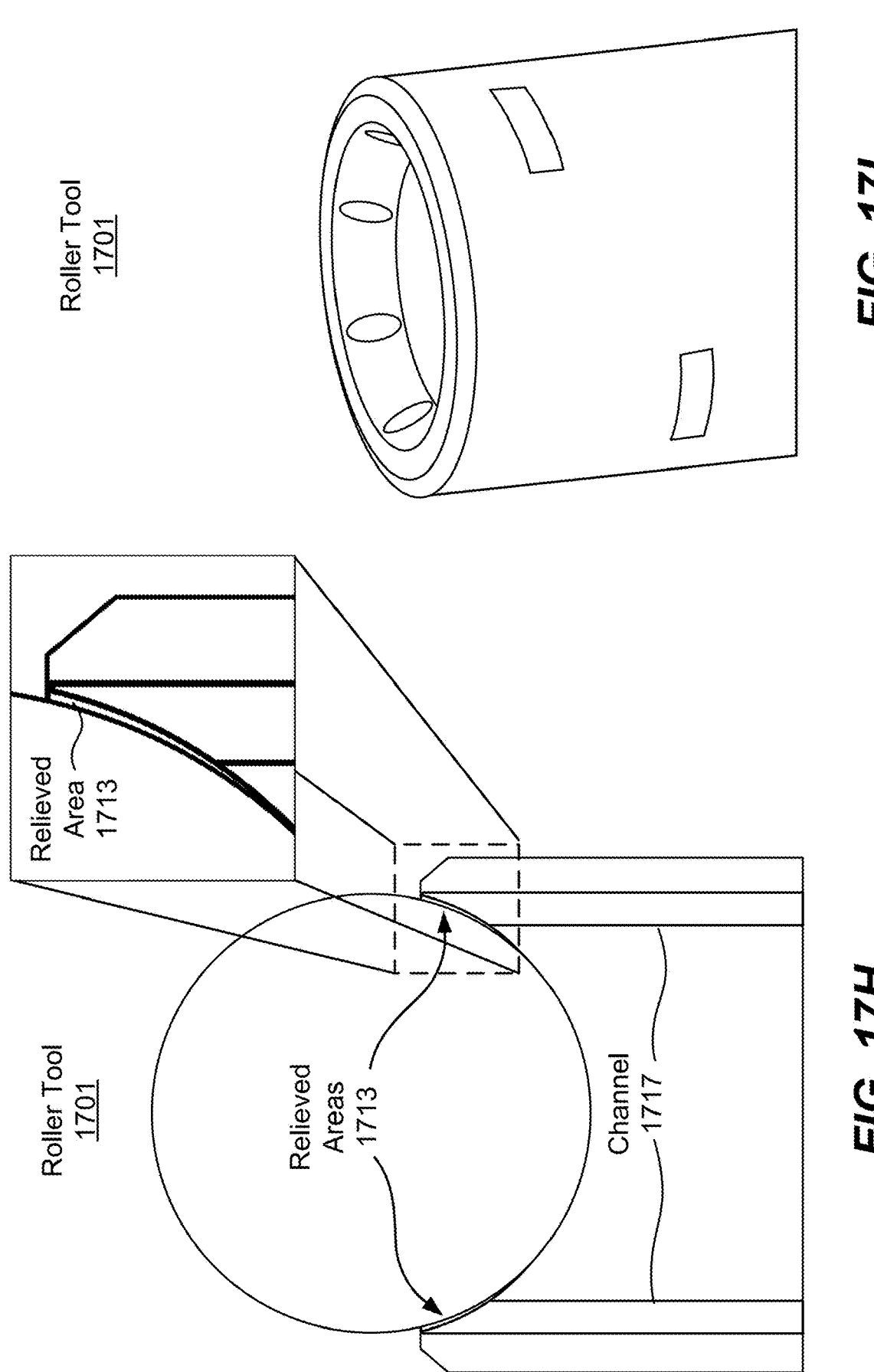
Figures 17J, 17K:
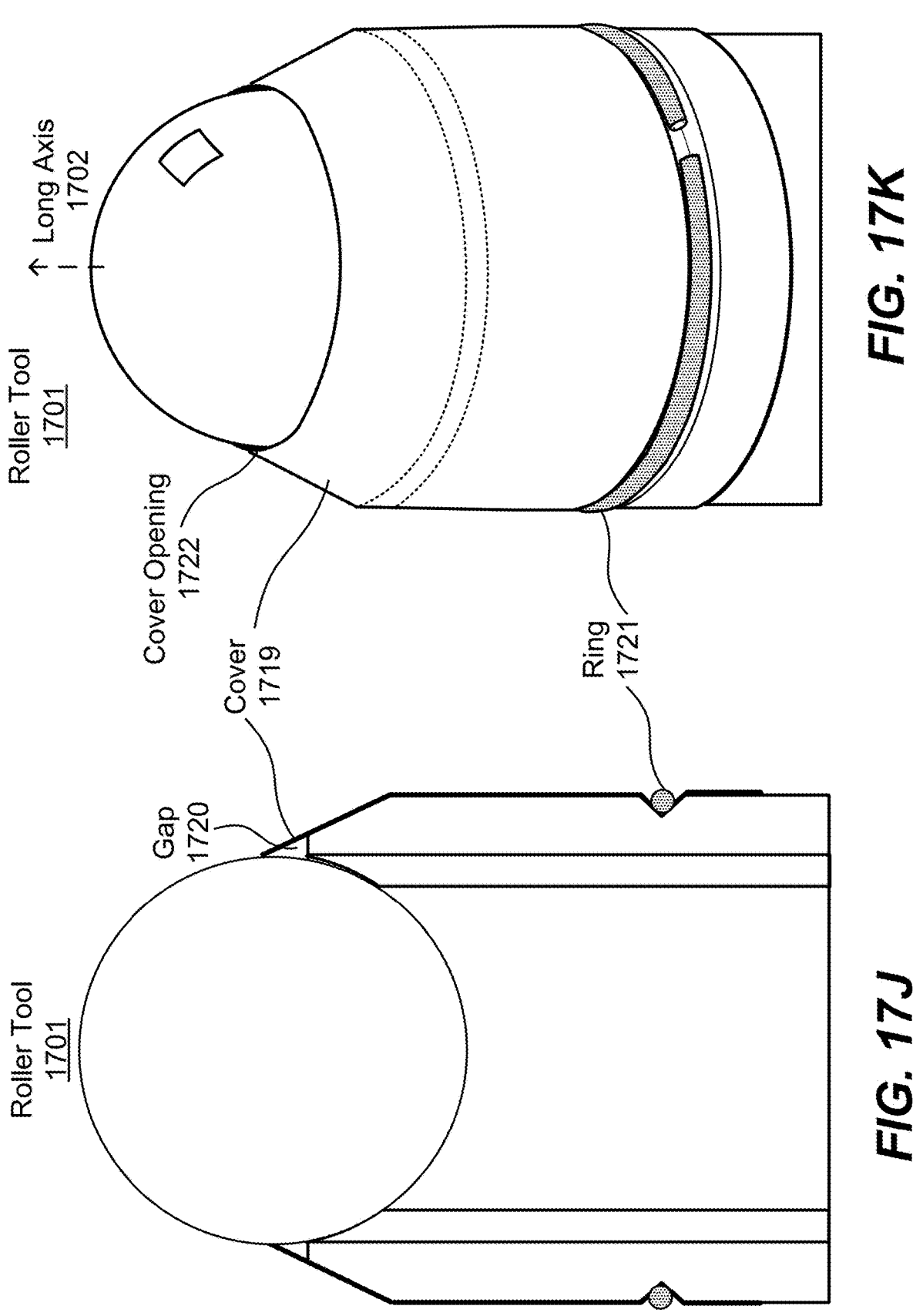
Figures 17L, 17M:
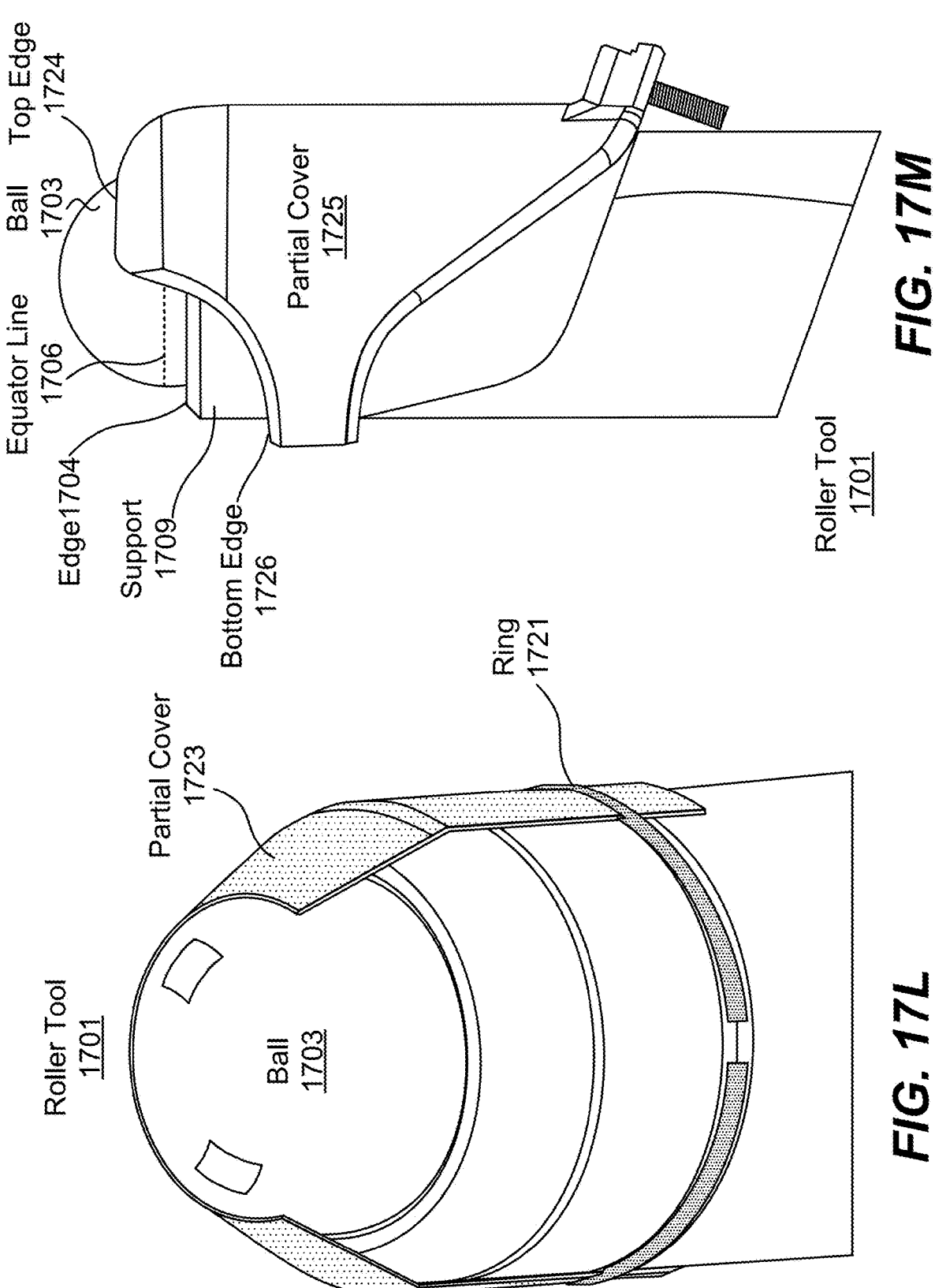
Figure 17O:
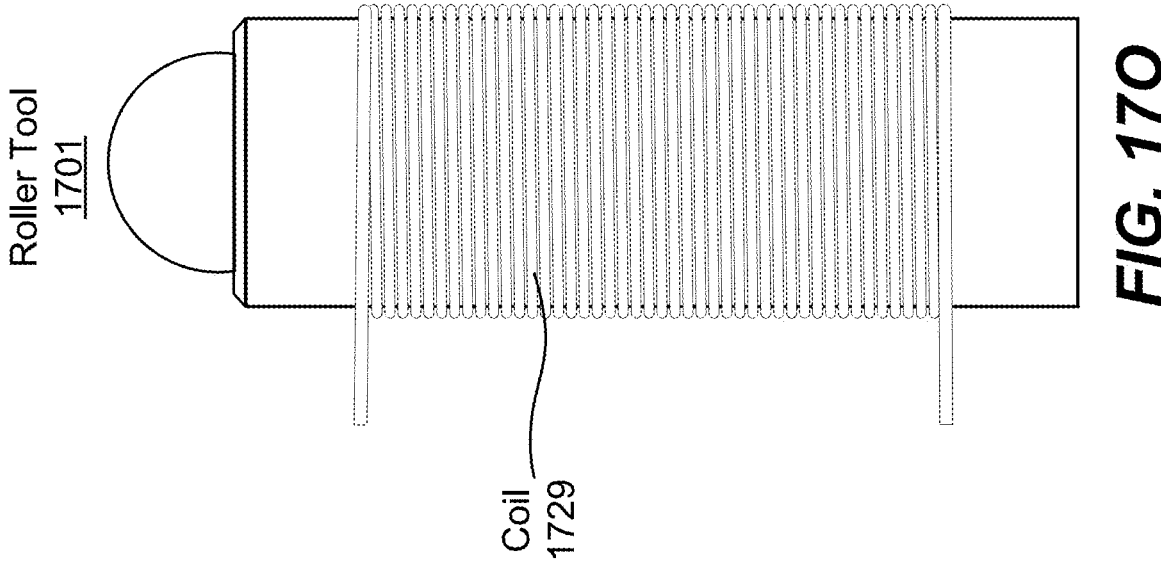
Figure 17N:
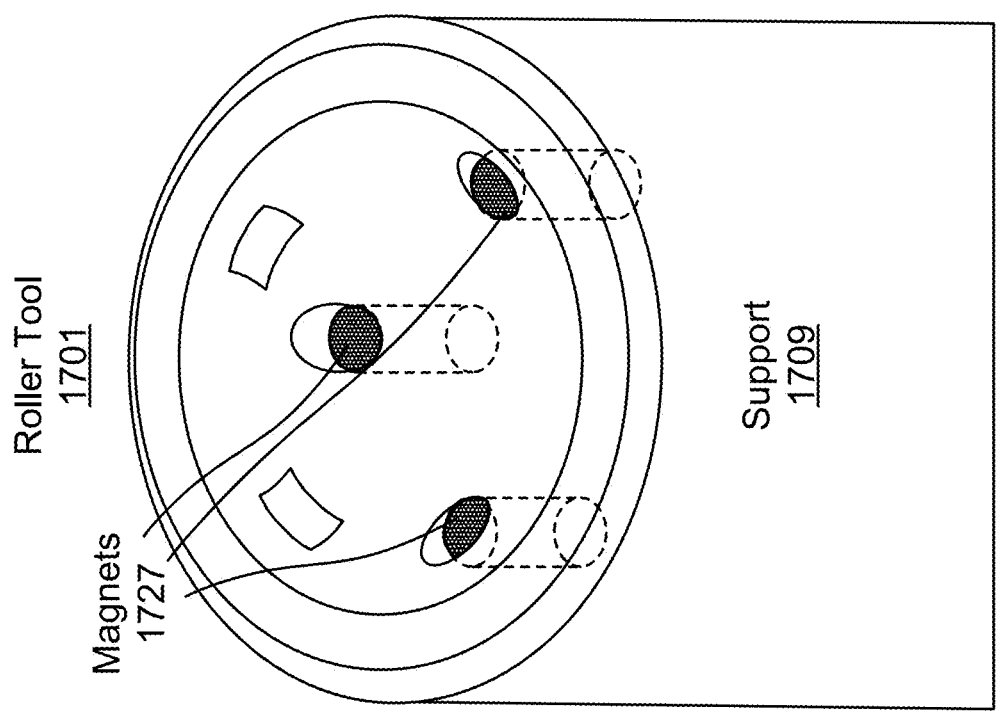
Figure 17P:
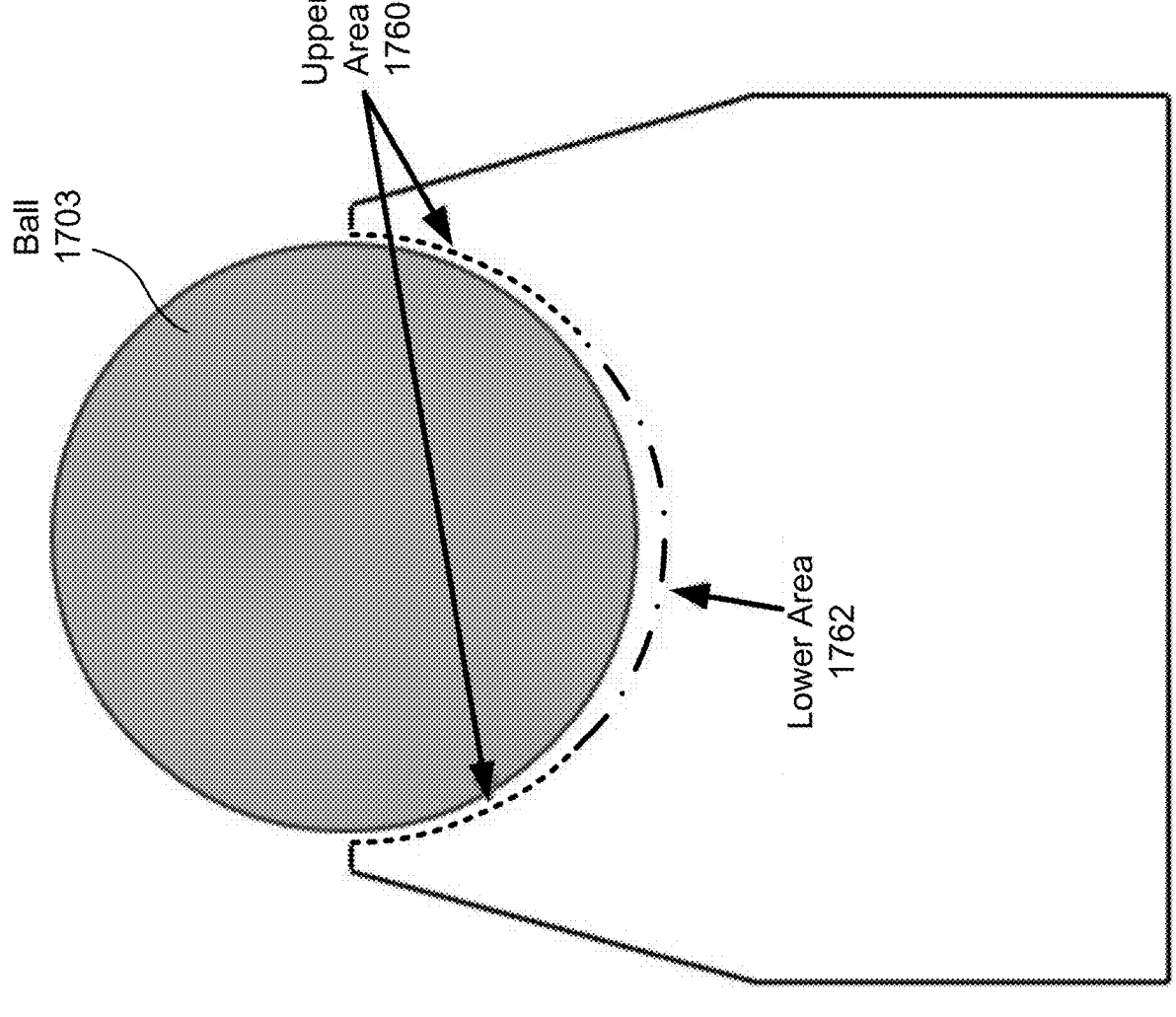
Figures 17Q, 17R:
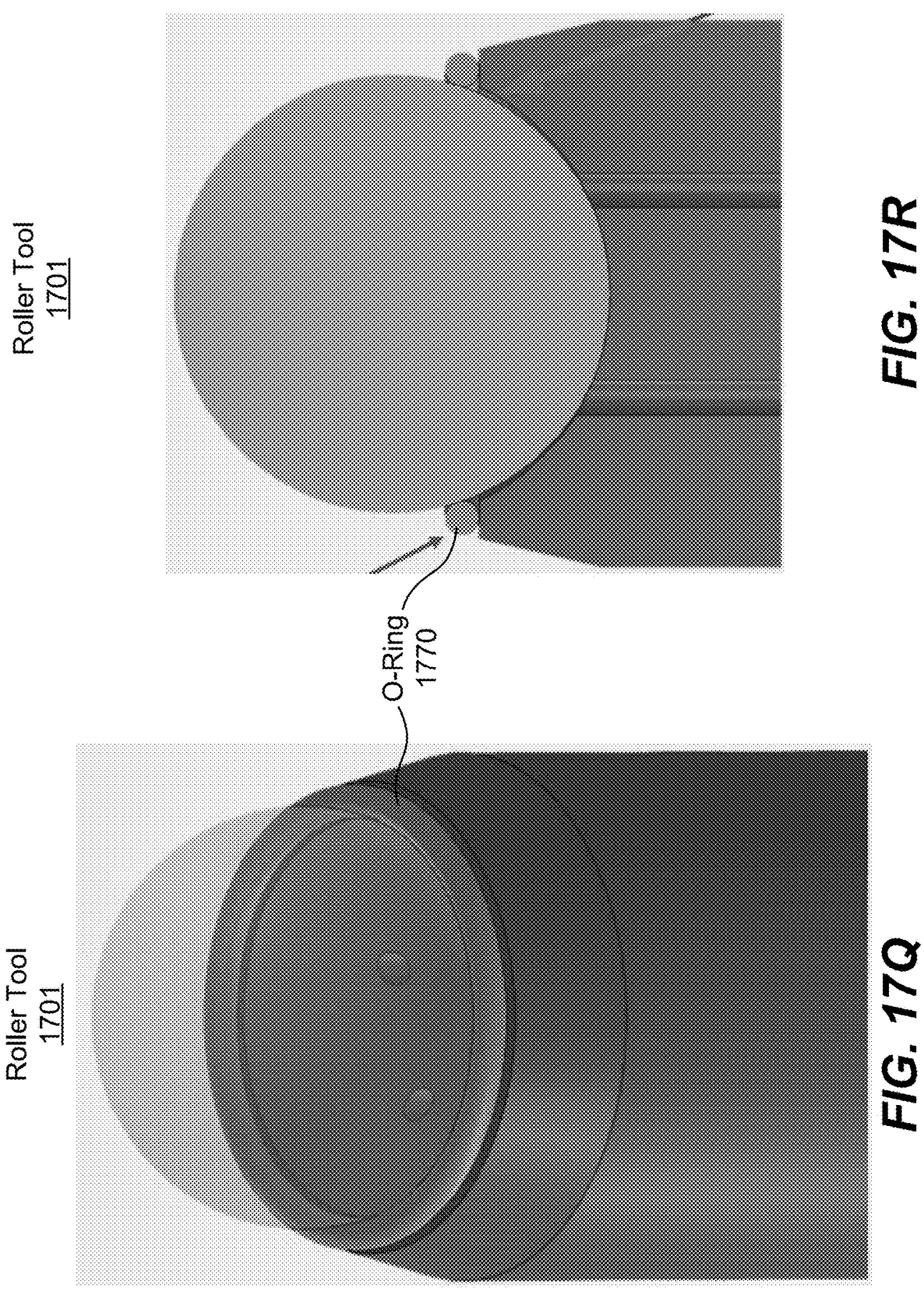

FIGS. 17B-17R are example diagrams of different embodiments of the roller tool 1701 in FIG. 17A. Note that a roller tool (e.g., 1701) may include any combination of aspects, features, or components described with respect to FIGS. 17A-17R (as long as the aspects, features, or components are not mutually exclusive). For simplicity, the following descriptions of FIGS. 17B-17R may omit figure reference numbers to components of the roller tool 1701 (e.g., omitting "1705" when referring to the socket 1705 or omitting "1703" when referring to the ball 1703).

In FIG. 17B, the support 1709 includes a beveled edge 1711 on the outer surface (e.g., around the outer surface of the support). Said differently, the outer diameter of the support 1709 is relieved. Among other advantages, the beveled edge 1711 allows greater clearance from nearby surfaces or objects when the roller tool 1701 is used to form a part. Thus, the beveled edge 1711 allows the tool 1701 to be applied to a part surface at greater angles (formed by the surface normal of the part relative to the long axis 1702 of the tool) without the edge 1711 contacting the surface (or another object). In general, no beveled edge or less beveling is more effective at supporting the loads applied during forming but this can limit the wall angles. Sockets with walls that don't extend to higher latitudes of the ball can have less beveling. However, there may be increased risk of dropping the ball from the socket during forming (depending on the one or more ball retention methods used).

In some embodiments, the socket 1705 may have a nonspherical surface (e.g., an aspheric surface, which may refer to an axisymmetric profile of continuous curvature). In FIG. 17C, select areas 1713 of the socket 1705 are relieved away from the surface of the ball 1703. More specifically, some areas 1715 of the socket 1705 are shaped to match the surface of the ball 1703 and other areas 1713 are shaped to not match the surface. In the example of FIG. 17C, the base area 1714 and the rim area 1712 of the socket 1705 are both relieved, while the intermediate area 1716 is shaped to contact the ball, resulting in a donut shaped contact area between the ball and the socket. More specifically, the base area 1714 in FIG. 17C has a relieved area with a radius of curvature less than ball 1703, and the rim area 1712 in FIG. 17C has a radius of curvature greater than ball 1703.

If a socket is shaped so all areas contact the ball prior to part forming (e.g., the socket curvature perfectly matches the ball curvature), when high pressures are applied to the socket and ball during part forming, the socket may deform due to these high pressures. For example, the edge or the rim area of the of the socket may (e.g., elastically) flare out at higher pressures, which reduces the contact area of the socket with the ball. Due to this, the base area 1714 receives even higher pressures during part forming. If the pressures become too high, galling can occur or the ball can delaminate a coating (e.g., 1707) on the socket at the base area 1714, thus damaging the roller tool 1701.

However, if a socket includes relieved areas (e.g., see FIGS. 17C and 17P) prior to part forming (e.g., prior to applying pressure to the roller tool 1701), when higher pressures are applied during part forming, the socket may change shape to increase the contact area of the socket with the ball (said differently, the socket becomes more spherical at higher pressures). In the example of FIG. 17C, pressure at the matching areas 1715 may result in the socket changing shape (e.g., deforming) such that and the amount of relief of the base area 1714 decreases, resulting in the contact area of the socket with the ball moving downward (note that the matching areas 1715 are not required for the socket to change shape under load. Other socket shapes, such as the discrete and continuously changing curvature embodiments described below (e.g., see description of FIG. 17P), may also be designed to change shape as pressure increases). Thus, the surface of the socket may be changed (e.g., deformed) to match the surface of the ball at higher pressures (even if the socket surface doesn't match the ball surface at lower pressures). Said differently, many (e.g., all or most) regions of the socket may be changed to contact the ball at high pressures (even if some of the areas doesn't contact the ball at lower pressures). However, when the higher pressures are removed, the socket may revert to its previous shape. Among other advantages, a socket with relieved areas can (a) reduce or eliminate galling or delamination, (b) increase the load capacity of the socket, or (c) some combination thereof.

Figure 20:
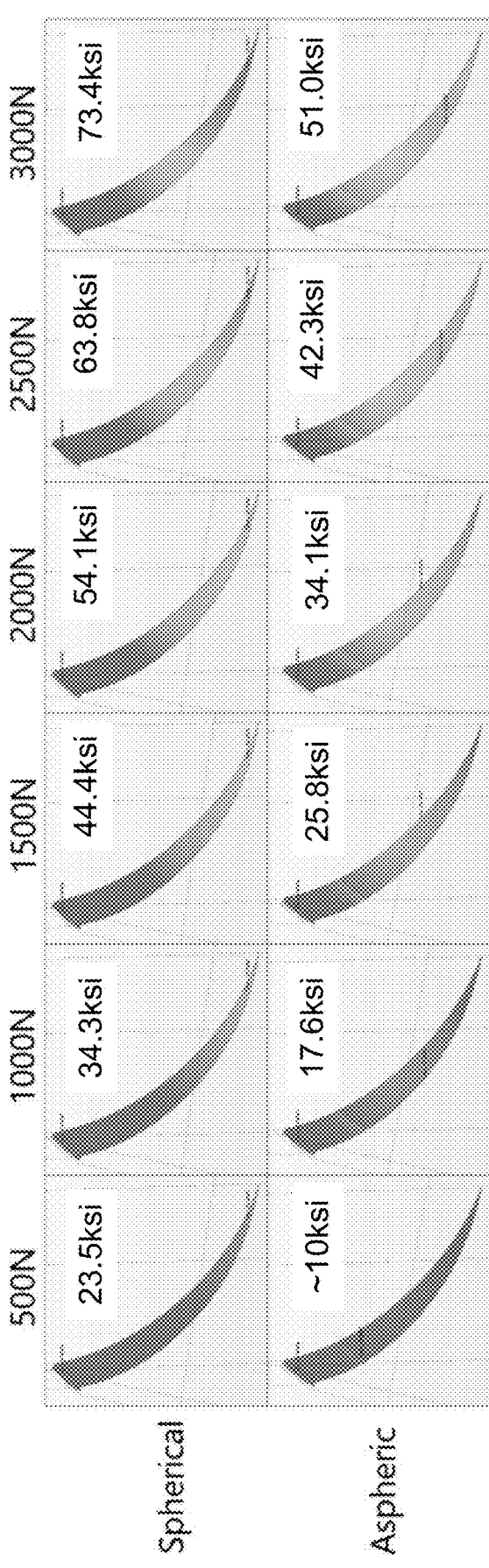
FIG. 20 is a diagram of plots illustrating load distribution for spherical and aspherical sockets.

FIG. 20 includes plots that illustrate the difference in load distribution for the spherical and nonspherical socket profiles. The plots illustrate that, for the nonspherical socket, the load spreads the contact over a larger area and reduces the peak contact stress (indicated by the ksi values in each plot) relative to the spherical socket. The plots also illustrate the annular contact band migration downward with increased load. For example the 25.8 ksi peak plot shows the location of the peak is about ⅔rds down, and the 51 ksi peak plot is down closer to ¾ths down. Optimization and the continuous curvature case may further tailor the curve.

Other example socket shapes are possible. For example, an aspheric embodiment is one of continuous curvature change across the entire socket surface. An example discrete embodiment is illustrated in FIG. 17P, which is a cross-sectional view of a socket with two relieved areas and without an intermediate area. A "lower" relieved area 1762, located at the base area 1714 and part of the intermediate area 1716, has a radius of curvature less than ball 1703, while an "upper" relieved area 1760, located at the rim area 1712 and the remaining part of the intermediate area 1716, has a radius of curvature greater than ball 1703. These upper and lower areas meet with tangency, and the ball 1703 rests on the upper area 1760 in the no-load condition. In this example embodiment, the arc center of the upper area does not lie on long axis 1702 (e.g., see FIG. 17S). When loaded, an annular band of Hertzian contact is formed, the center of which migrates downward with increased load. The amount of the contact area between the ball and the socket is based on the size and locations of the relieved areas (e.g., the difference in a relieved area radius relative to the radius of the ball), the magnitude of the applied load, and the Young's moduli of ball 1703 and support 1709. The upper and lower relieved areas may be subdivided by a third or more areas of intermediate radius to more finely control the load versus contact pressure function. Discrete regions may be replaced with a continuously changing curvature (e.g., an aspheric profile) that can be defined to prescribe a desired load versus contact function. An example profile may be determined by a function influenced by the constraint gradient imposed by support 1709, which may be altered by the presence and dimensions of beveled edge 1711.

Figure 17S:
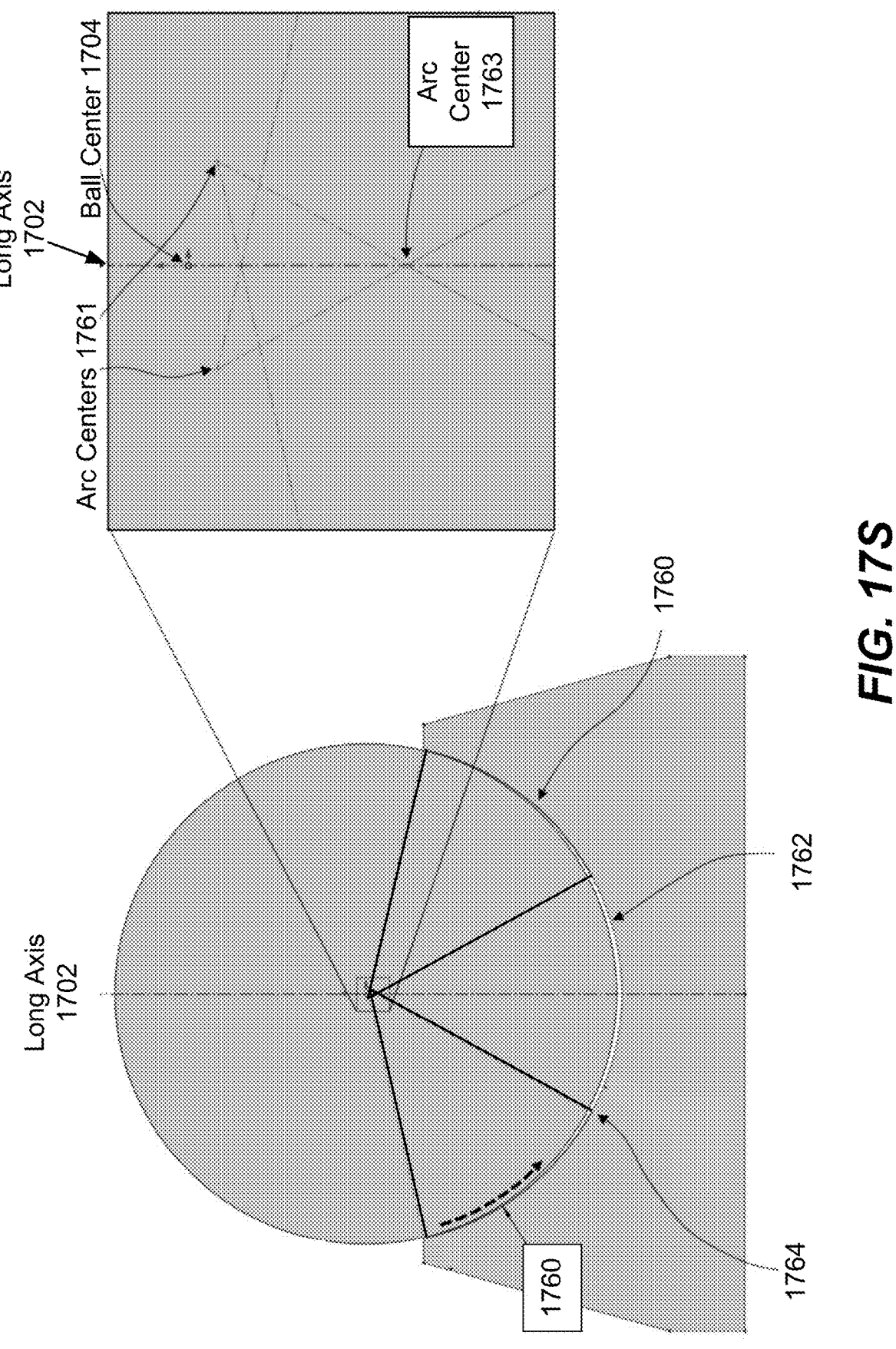

FIG. 17S illustrates some of the features of FIG. 17P described above. For example, the center 1704 of the ball 1703, the arc center 1763 of the lower area 1762, and the arc centers 1761 of the upper area 1760 are illustrated. As illustrated, arc centers 1761 do not lie on long axis 1702. This is a consequence of the arc tangency and the difference in radii. If the radii were equal, both arc centers would be coincident with long axis 1702. Furthermore, arc center 1763 is lies on long axis 1702 but is below the ball center 1704. Furthermore, the areas 1760 and 1762 meet at point 1764 with tangency. Said differently, areas 1760 and 1762 are axisymmetric arc segments that meet with tangency.

As previously stated, the examples of FIGS. 17P and 17S include two regions. However, other embodiments may have additional regions, such as intermediate regions, e.g., that have tangency (e.g., as described above with respect to 1760). Note that an aspheric embodiment may correspond to the socket having an infinite number of regions with tangency.

In FIG. 17D, the roller tool 1701 includes a channel 1717 passing through the support 1709. FIG. 17E is a perspective diagram of the roller tool 1701 of FIG. 17D (note that the ball is not illustrated). The channel 1717 allows fluid (e.g., gas or liquid) to pass through and interact with the ball 1703. An example gas is air, and an example fluid is a lubricant, such as oil. The socket may include one or more relieved areas (e.g., 1713) to increase fluid interaction with the ball, for example, at the area where the channel intersects the socket. In the example of FIG. 17D, the base area 1714 is slightly relieved for this purpose since the channel intersects the socket 1705 at the base area 1714. Although only a single channel is illustrated in FIGS. 17D and 17E, the support 1709 may include additional channels (e.g., see FIGS. 17F and 17G), for example, to increase the amount of fluid flow (e.g., multiple channels may increase flow without potentially adding as much friction as a single larger hole in the center of the pocket, which is typically the portion of the socket that receives the highest load). Additionally, the fluid may flow continuously, periodically, intermittently, in response to a triggered condition, or some combination thereof. Additionally, the fluid may flow while the tool is forming a part (e.g., the tool is applying force to a part surface to form it) or while the tool is not forming a part.

In some embodiments, a fluid may be controlled to flow away from the ball and into the channel 1717. For example, the fluid can be used to retain the ball in the socket via vacuum retention (e.g., when the ball isn't in contact with a part or otherwise constrained to the socket 1705). Additionally, or alternatively, a fluid may be controlled to flow out of the channel and toward the ball. For example, the fluid (e.g., air) can be used to retain the ball in the socket (e.g., when the ball isn't in contact with a part or otherwise constrained to the socket 1705). Bernoulli's principle states that the fast-moving fluid (e.g., air) around the sides of the ball is at a lower pressure than the surrounding stationary air. If the ball begins to leave the stream of air, the still higher-pressure air will push it back in. Thus, the ball remains suspended above the socket as long as high-pressure fluid is flowing through the channels.

In another example of the fluid flowing out of the channel and toward the ball, the fluid is a lubricant to lubricate the tool during operation. In another example, a fluid flowing toward the ball may reduce (e.g., prevent) contamination or debris from entering or staying in the socket, for example, by flushing out contamination (e.g., metal particles) in the socket. The fluid may additionally, or alternatively, keep the ball cool during part forming.

In another example, the fluid applies pressure to the ball (e.g., 10,000 PSI). This fluid may prevent contact between the ball and socket or reduce the contact area of the ball with the socket (e.g., when the ball is in contact with the surface of a part). For example, the fluid pressure against the ball may be dynamically controlled according to the pressure of the ball against the surface of a part (e.g., controlled to match (within a deviation threshold) the pressure of the ball against the surface of the part). Among other advantages, this high-pressure fluid may reduce friction or damage caused between the ball and socket during part forming.

Figure 19:
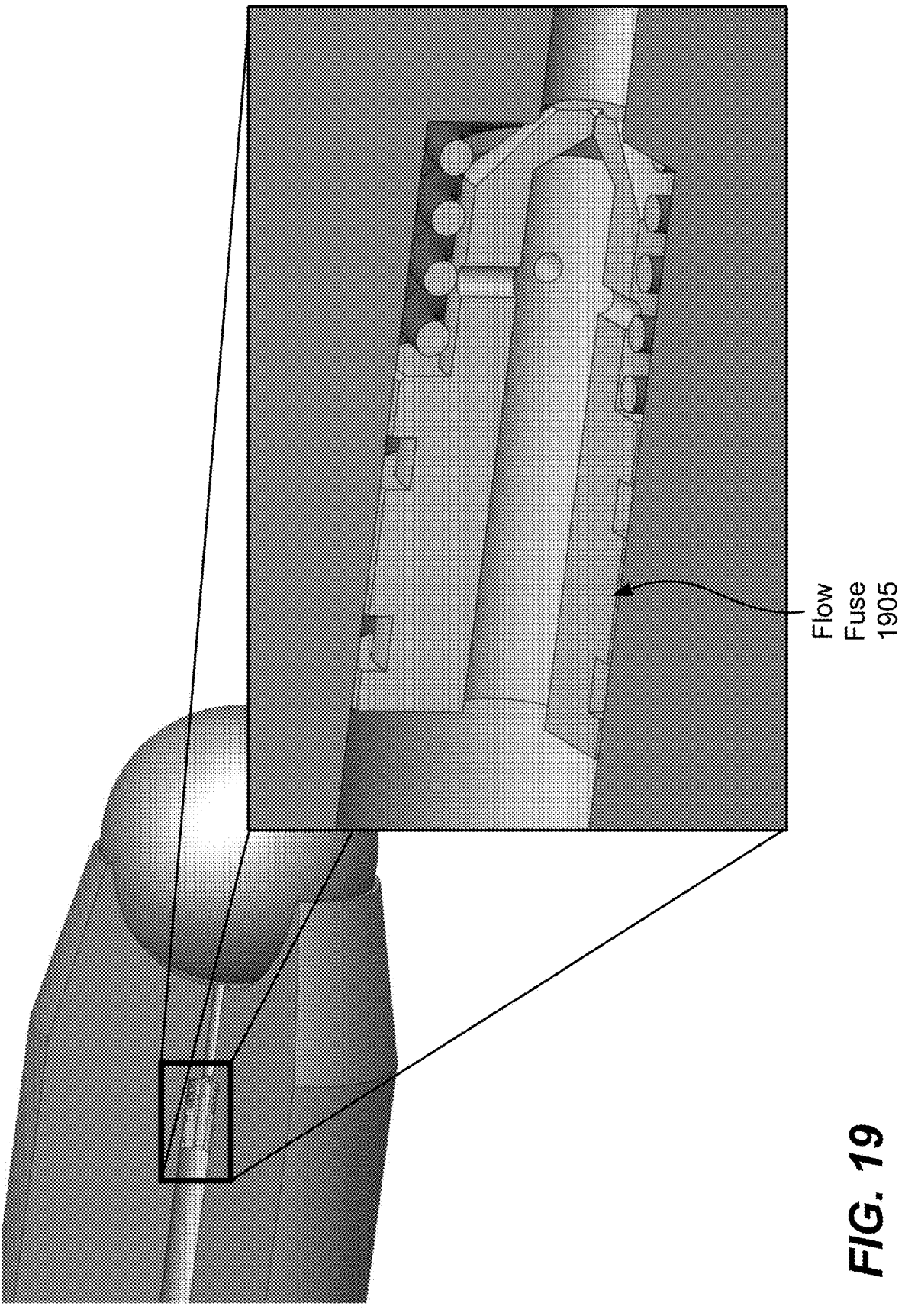
FIG. 19 is a diagram of an example roller tool with a flow fuse.

In some embodiments, fluid is controlled to prevent the high-pressure fluid from flowing if the ball is unexpectedly removed from the socket (e.g., due to a mechanical or software failure) or if there is an unexpected loss of contact of the ball with a part surface. The ball may be intentionally removed as well, for example, when the forming tool is backed away from a part when moving between forming areas or when the part forming is complete. Events that result in the ball being removed from the socket (intentionally or unintentionally) are referred to as "loss events." To prevent high-pressure fluid from flowing if the ball is removed from the socket, for example, the fluid may be controlled to apply high pressure to the ball but have a low flow rate. In another example, if a loss event occurs, the flow rate or the pressure of the fluid is quickly reduced. For example, the channel 1717 includes a fluid valve and the fluid is stored in a high-pressure reservoir (e.g., thousands of PSI). During operation of the roller tool 1701, the valve is opened, and fluid is allowed to flow through the channel, thus exposing the ball to the high-pressure fluid. However, if a loss event occurs, a controller may quickly close the valve to prevent high pressure fluid from flowing out of the roller tool 1701. In another example, the fluid pressure may be applied by a small diameter hydraulic piston that moves (note: due to the small diameter, the linear factor does not need to be large to create the high fluid pressure). But if a loss event occurs, movement of the piston can be stopped to reduce or stop the fluid flow. An additional passively controlled example includes the use of a flow fuse in a channel (e.g., see an example flow fuse 1905 in FIG. 19. A flow fuse may enable fluid flow when the flow is restricted by the forming ball and may enable flow cutoff when the ball is unloaded. The contact band of the socket may initially cut the flow to near zero, allowing the flow fuse bypass or leakage flow to start equilibrating the area behind the ball with the supply pressure until the point that the spring opens the check valve applying full line pressure behind the ball. The downstream pressure reset condition may also be satisfied by fluid compression by the loaded ball in the case of flow fuses without bypass or leakage flow. In the event that forming ball is unloaded, the sudden increase in flow and/or change in pressure across the flow fuse would close the valve again. To re-set, the hydraulic system may reach a condition that satisfies re-opening. For example, the end is re-sealed by the ball, and the high downstream pressure used to reopen the valve may be satisfied by a minor bypass flow around or through the flow fuse. The sealed cavity created above area 1762 and below the seal of the annular contact of the ball above may create a resettable condition under load. The ball may compress lubricant in this cavity sufficiently under load to re-open the flow fuse without a bypass flow. Other socket variations may be compatible.

In FIG. 17H, the roller tool 1701 includes channels 1717 passing through the support 1709. FIG. 17I is a perspective diagram of the roller tool 1701 of FIG. 17H (note that the ball is not illustrated). FIGS. 17H-I include channels 1717 intersecting the rim area 1712 of the socket 1705 (instead of the base area 1714 as illustrated in FIGS. 17D-17G). The channels 1717 of FIGS. 17H-I may be used for similar purposes as the channels of FIGS. 17D-17G as previously described. However, channels at the rim area 1712 may be more effective at providing fluid for lubrication or reducing or clearing contamination in the socket compared to a channel at the base area 1714. In contrast, a channel at the base area 1714 may be more effective at applying pressure to the ball when the ball is forming a part. Similar to FIGS. 17D-17E, the roller tool 1701 in FIGS. 17H-I includes relieved areas 1713 where the channels 1717 intersect the socket (in this example, at the rim area 1712) to help the fluid interact with the ball. For example, the relieved areas 1717 allow the passage of air or lubricant during the part forming process.

In FIGS. 17J and 17K, the roller tool 1701 includes a cover 1719 held in place by a ring 1721. Specifically, FIG. 17J is a cross-sectional diagram and FIG. 17K is a perspective diagram of the roller tool 1701 with the cover 1719. The cover 1719 partially covers the ball and the support 1709 to cover the gap 1720 between the ball and the socket 1705. However, the cover 1719 forms an opening 1722 that leaves a portion of the ball exposed to contact a part surface (during part forming). The opening 1722 is smaller than the ball (e.g., the diameter of the opening 1722 is smaller than the diameter of the ball).

The cover 1719 may reduce or prevent debris or contamination from entering the gap. Additionally, or alternatively, the cover 1719 may create a seal for improved ball retention in the socket (e.g., via vacuum retention). The cover 1719 may be a thin and flexible material, such as a membrane. In other examples, the cover 1719 may be made of firmer material, such as (e.g., sheet) metal or plastic (in these examples, the cover may be referred to as a "clip"). These example covers may contribute to mechanically retaining the ball in the socket. In embodiments that include a cover that contributes to retaining the ball in the socket (e.g., the cover opening is small enough or shaped such that it prevents the ball from leaving the socket), the edge 1704 of the socket 1705 may be below (or before) the equator line 1706 of the ball (e.g., to increase the surface area of the ball available for part forming) and the opening 1722 of the cover may be above (or after) the equator line 1706. The cover 1719 is held in place via ring 1721, which rests in a groove of the support 1709. However, other retention mechanisms may be used. For example, as illustrated in FIG. 17M, a cover may be secured via a screw.

In the example of FIGS. 17J-K, the cover 1719 extends entirely around the long axis 1702 of the of the roller tool 1701 to cover the entire gap 1720 (said differently, the cover 1719 extends 360 degrees around the long axis 1702). However, this is not required. Instead, a cover may only partially cover the gap 1720 of the roller tool 1701 (e.g., a cover only extends 180 degrees around the long axis 1702). FIGS. 17L and 17M provide additional examples of partial covers. FIG. 17L is a diagram of the roller tool 1701 with a first example partial cover 1723, according to one or more embodiments. Partial cover 1723 is similar in shape and appearance to cover 1719 except it only partially covers the gap 1720. FIG. 17M is a diagram of the roller tool 1701 with a second example partial cover 1725, according to one or more embodiments. In the example of FIGS. 17L and 17M, the partial covers 1723, 1725 contribute to retaining the ball in the socket (said differently, they may be one of several aspects or components used to retain the ball in the socket). In the example of FIG. 17M, the equator line 1706 of the ball 1703 is between the top edge 1724 of the partial cover 1725 (as opposed to the bottom edge 1726) and the edge 1704 of the socket.

Partial covers (e.g., 1723 and 1725) may provide the advantages described above with respect to full covers (e.g., 1719), such as reducing debris from entering the gap and contributing to ball retention. However, a partial cover (e.g., 1723 or 1725) may provide the additional advantage of providing a larger portion of the ball exposed for part forming (compared to full covers). For example, the additional surface area exposed by a partial cover may enable the roller tool 1701 to be applied to a part surface at greater angles (formed by the surface normal of the part relative to the long axis 1702 of the tool) without the partial cover contacting the part surface. In these embodiments, a controller (e.g., controller 255 or controller 1120) may rotate or orient the roller tool 1701 accordingly to keep the exposed portion of the ball facing the part surface.

FIG. 17N is a diagram of the roller tool 1701 (ball not illustrated) with magnets 1727 fixed (e.g., embedded) in the support 1709. Magnetic fields from the magnets 1727 may be used to help retain the ball in the socket (assuming the ball is magnetic). In the example of FIG. 17N, the magnets 1727 are in cavities in the socket surface (e.g., the cavities were formed by drilling into the socket surface). The cavities may be located in any area of the socket, however it may be advantageous for them to be located at areas in the socket that tend to receive less pressure (e.g., the smallest pressure), such as the intermediate area 1716 (as illustrated in FIG. 17N) or the rim area 1712, to reduce or avoid disruptions to ball rotation. In the example of FIG. 17N, debris or contamination may accumulate in these cavities. To avoid this, the magnets 1727 may be placed in cavities that don't intersect the socket. For example, the magnets 1727 may be in cavities formed by drilling from behind the socket.

FIG. 17O is a diagram of a roller tool 1701 with an electromagnet to help with ball retention. Specifically, the support 1709 includes an electromagnetic coil 1729. Thus, by driving current through the coil 1729, a magnetic field may be created to help retain the ball in the socket. The electromagnet may further include a magnetic core inside the coil 1729 to increase the magnetic field, thus increasing ball retention performance.

FIGS. 17Q and 17R are diagrams of a roller tool 1701 with an O-ring 1770. The O-ring 1770 is on the edge 1704. The O-ring 1770 may be wedged between the ball and the socket. The O-ring 1770 may be made of a low-friction material (e.g., plastic) for example, with an ID less than that of the ball diameter. The o-ring 1770 may create a seal for improved ball retention in the socket (e.g., via vacuum retention via one or more channels in the support 1709). Additionally, the rim area 1712 includes a relieved area (similar to 1713). This allows clearance for the ball to expand when a load is applied.

Although previous descriptions provide examples of roller tool end effectors, the below paragraphs describe additional examples. The descriptions below may omit features previously described and/or include features that are in addition to or alternative to the features previously described.

Some aspects relate to a system configured to form a part (e.g., 110) in an initial geometry into a desired geometry, the system including: a roller tool (e.g., 1300, 1701); and a robot arm (e.g., 120) configured to: (a) press the roller tool onto a surface of the part and (b) move the pressed roller tool along the surface of the part to form the desired geometry, wherein the roller tool includes: a ball (e.g., 1703); and a support (e.g., 1310, 1709) with a socket (e.g., 1705) that receives the ball and enables the ball to rotate in the socket, the support including a channel (e.g., 1717) configured to carry fluid through the support toward the ball or away from the ball, the socket configured to, responsive to the ball being pressed onto the surface above a threshold pressure, deform such that contact area of the ball with the socket increases (e.g., as described with respect to FIG. 17C).

In some aspects (e.g., as described with respect to FIG. 17C), the contact area of the ball with the socket increases as pressure of the ball onto the surface increases above the threshold pressure; the socket includes a relieved area, wherein the relieved area decreases responsive to the ball being pressed onto the surface above the threshold pressure; and at least one of: at least a portion of the base area (e.g., 1714) of the socket is the relieved area; or at least a portion of the rim area (e.g., 1712) of the socket is the relieved area.

In some aspects (e.g., as described with respect to FIGS. 17D-17I), the socket is relieved at an area where the channel intersects the socket; and at least one of: the channel intersects the socket at the base area of the socket; or the channel intersects the socket at the rim area of the socket.

In some aspects, the edge (e.g., 1704) of the socket (e.g., 1705) does not extend beyond the equator line (e.g., 1706) of the ball in the socket.

In some aspects, the system further includes: a cover (e.g., 1719, 1723, or 1725) placed over a portion of the ball and a portion of the support, the cover configured to cover a gap (e.g., 1720) between the ball and the socket. In some aspects, the cover forms an opening (e.g., 1722) that exposes the ball, and the opening is smaller than the ball. In some aspects, the cover is configured to contribute to retaining the ball in the socket (e.g., as described with respect to FIGS. 17J-17M). In some aspects, the equator line (e.g., 1706) of the ball is between the edge (e.g., 1704) of the socket and an edge (e.g., 1724) of the opening of the cover (e.g., see FIG. 17M). In some aspects, the cover only covers a portion of the gap between the ball and the socket (e.g., see partial covers 1723 and 1724). In some aspects, the cover covers the entire gap between the ball and the socket (e.g., see full cover 1719).

In some aspects, the support includes a beveled edge (e.g., 1711).

In some aspects, the system further includes a magnet configured to contribute to retaining the ball in the socket (e.g., see FIGS. 17N and 17O).

Some aspects relate to a system configured to form a part (e.g., 110) in an initial geometry into a desired geometry, the system including: a roller tool (e.g., 1300, 1701); and a robot arm (e.g., 120) configured to: (a) press the roller tool onto a surface of the part and (b) move the pressed roller tool along the surface of the part to form the desired geometry, wherein the roller tool includes: a ball (e.g., 1703); and a support (e.g., 1310, 1709) with a socket (e.g., 1705) that receives the ball and enables the ball to rotate in the socket, the socket configured to, responsive to the ball being pressed onto the surface above a threshold pressure, deform such that contact area of the ball with the socket increases (e.g., see description with respect of FIG. 17C).

In some aspects (e.g., as described with respect to FIG. 17C), the contact area of the ball with the socket increases as pressure of the ball onto the surface increases above the threshold pressure.

In some aspects (e.g., as described with respect to FIG. 17C), the socket includes a relieved area (e.g., 1713), where the relieved area decreases responsive to the ball being pressed onto the surface above the threshold pressure.

In some aspects, the system includes at least one of: at least a portion of the base area (e.g., 1714) of the socket is the relieved area; or at least a portion of the rim area (e.g., 1712) of the socket is the relieved area.

Some aspects relate to a system configured to form a part (e.g., 110) in an initial geometry into a desired geometry, the system including: a roller tool (e.g., 1300, 1701); and a robot arm (e.g., 120) configured to: (a) press the roller tool onto a surface of the part and (b) move the pressed roller tool along the surface of the part to form the desired geometry, wherein the roller tool includes: a ball (e.g., 1703); and a support (e.g., 1310, 1709) with a socket (e.g., 1705) that receives the ball and enables the ball to rotate in the socket, the support including a channel (e.g., 1717) configured to carry fluid through the support toward the ball or away from the ball.

In some aspects, the socket is relieved at an area where the channel intersects the socket (e.g., see description with respect to FIGS. 17D-17I). In some aspects, the channel intersects the socket at the base area (e.g., 1714) of the socket (e.g., see FIGS. 17D-17G). In some aspects, the channel intersects the socket at the rim area of the socket (e.g., see FIGS. 17H-17I).

Other aspects include components, devices, systems, improvements, methods, processes, applications, computer readable mediums, and other technologies related to any of the above.

11. Example Machine Architecture

Figure 18:
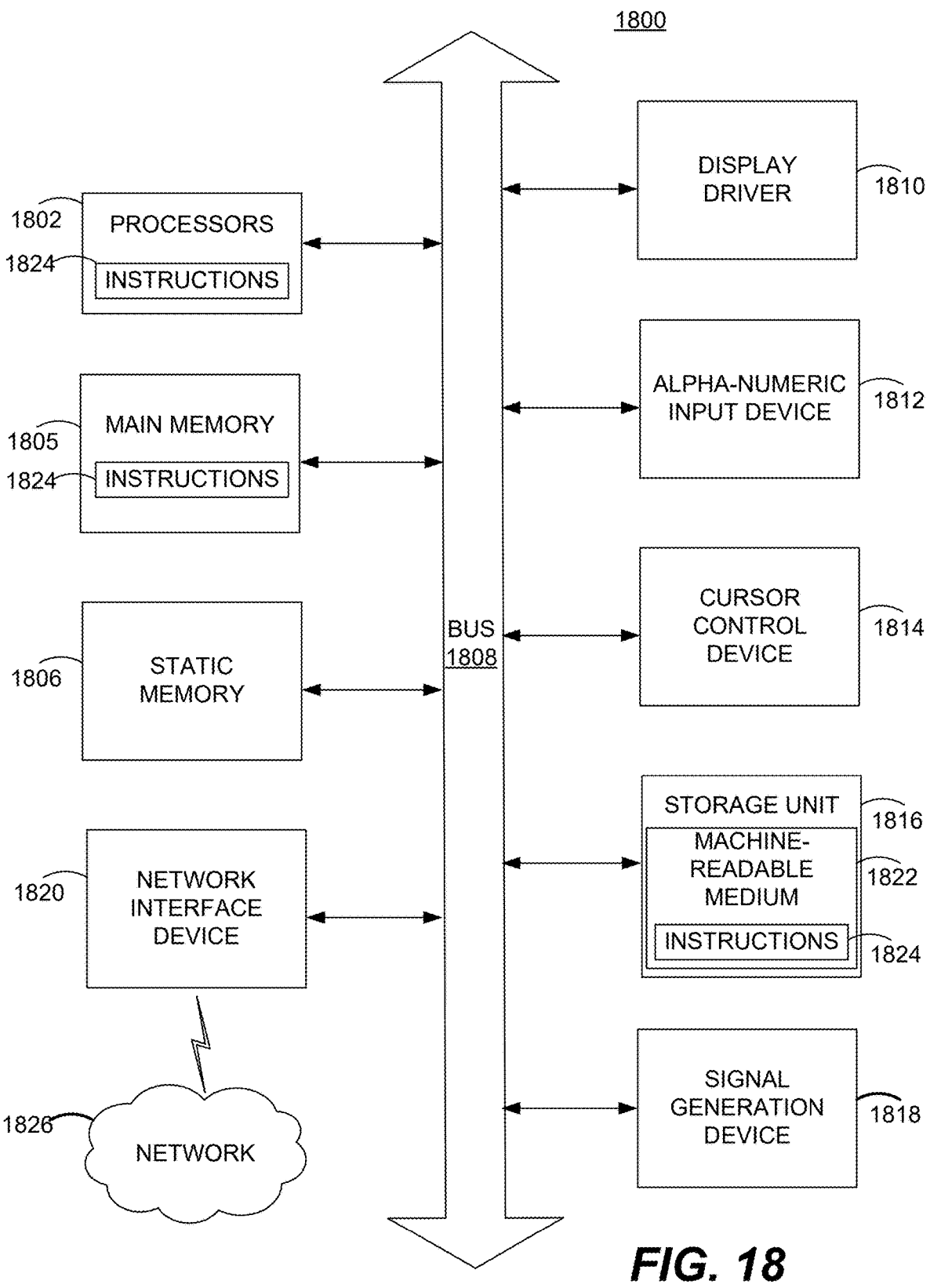
FIG. 18 is a block diagram illustrating components of an example machine able to read instructions from a machine-readable medium and execute them in a processor, according to an embodiment.

In some embodiments, the controller (e.g., controller 255 or controller 1120) is a machine able to read instructions from a machine-readable medium and execute them in a set of one or more processors (e.g., working individually or collectively). FIG. 18 is a block diagram illustrating components of an example machine able to read instructions from a machine-readable medium and execute them in a set of one or more processors. Specifically, FIG. 18 shows a diagrammatic representation of a machine in the example form of a computer system 1800. The computer system 1800 can be used to execute instructions 1824 (e.g., program code or software) for causing the machine to perform any one or more of the methodologies (or processes) described herein. In alternative embodiments, the machine operates as a standalone device or a coupled (e.g., networked) device that connects to other machines. In a networked deployment, the machine may operate in the capacity of a server machine or a client machine in a server-client network environment, or as a peer machine in a peer-to-peer (or distributed) network environment. Here, the robots, e.g., 400A, 400B, and other automated components may include all or a portion of the component of the described computer system (or machine) 1800. The robots, e.g., 400A, 400B, and/or other automated components may be programmed with program code to operate as described with FIGS. 1-16B. Such operation also include program code corresponding to the disclosed models, e.g., 1600, 1615, for effecting the resulting geometries through the robots, e.g., 400A, 400B and other automated components.

The machine may be a server computer, a client computer, a personal computer (PC), a tablet PC, a smartphone, an internet of things (IoT) appliance, a network router, or any machine capable of executing instructions 1824 (sequential or otherwise) that specify actions to be taken by that machine. Further, while only a single machine is illustrated, the term "machine" shall also be taken to include any collection of machines that individually or jointly execute instructions 1824 to perform any one or more of the methodologies discussed herein.

The example computer system 1800 includes one or more processing units ("processors 1802" in FIG. 18). The set of one or more processors 1802 is, for example, one or more central processing units (CPUs), one or more graphics processing units (GPUs), one or more digital signal processors (DSPs), one or more state machines, one or more application specific integrated circuits (ASICs), one or more radio-frequency integrated circuits (RFICs), or any combination of these. The set of processors 1802 also may be a controller. The controller may include a non-transitory computer readable storage medium that may store program code to operate (or control) the robots, e.g., 100A, 100B, and/or other automated components described herein.

The set of processors 1802 should be understood that the corresponding functionality may be distributed among multiple processors using various ways, including using multicore processors, assigning certain operations to specialized processors (e.g., graphics processing units), and dividing operations across a distributed computing environment. Any reference to a the set of processors 1802 should be construed to include such architectures.

The computer system 1800 also includes a main memory 1804. The computer system may include a storage unit 1816. The processor 1802, memory 1804 and the storage unit 1816 communicate via a bus 1808.

In addition, the computer system 1800 can include a static memory 1806, a display driver 1810 (e.g., to drive a plasma display panel (PDP), a liquid crystal display (LCD), or a projector). The computer system 1800 may also include alphanumeric input device 1812 (e.g., a keyboard), a cursor control device 1814 (e.g., a mouse, a trackball, a joystick, a motion sensor, or other pointing instrument), a signal generation device 1818 (e.g., a speaker), and a network interface device 1820, which also are configured to communicate via the bus 1808.

The storage unit 1816 includes a machine-readable medium 1822 on which is stored instructions 1824 (e.g., software) embodying any one or more of the methodologies or functions described herein. The instructions 1824 may also reside, completely or at least partially, within the main memory 1804 or within the processor 1802 (e.g., within a processor's cache memory) during execution thereof by the computer system 1800, the main memory 1804 and the processor 1802 also constituting machine-readable media. The instructions 1824 may be transmitted or received over a network 1826 via the network interface device 1820.

While machine-readable medium 1822 is shown in an example embodiment to be a single medium, the term "machine-readable medium" should be taken to include a single medium or multiple media (e.g., a centralized or distributed database, or associated caches and servers) able to store the instructions 1824. The term "machine-readable medium" shall also be taken to include any medium that is capable of storing instructions 1824 for execution by the machine and that cause the machine to perform any one or more of the methodologies disclosed herein. The term "machine-readable medium" includes, but not be limited to, data repositories in the form of solid-state memories, optical media, and magnetic media.

While machine-readable medium 722 (also referred to as a computer-readable storage medium) is shown in an embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" shall also be taken to be a non-transitory machine-readable medium. The term "machine-readable medium" includes, but not be limited to, data repositories in the form of solid-state memories, optical media, and magnetic media.

12. Additional Considerations

Embodiments can include every combination and permutation of the various system components and the various method processes.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate+/−10% unless another meaning is apparent from the context. From example, "approximately ten" should be understood to mean "in a range from nine to eleven."

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. A system configured to form a part in an initial geometry into a desired geometry, the system comprising:
a roller tool; and
a robot arm configured to: (a) press the roller tool onto a surface of the part and (b) move the pressed roller tool along the surface of the part to form the desired geometry, wherein the roller tool includes:
a ball; and
a support with a socket that receives the ball and enables the ball to rotate in the socket, the support including a channel configured to carry fluid through the support toward the ball or away from the ball, the socket configured to, responsive to the ball being pressed onto the surface above a threshold pressure, deform such that contact area of the ball with the socket increases.

2. The system of claim 1, wherein:
the contact area of the ball with the socket increases as pressure of the ball onto the surface increases above the threshold pressure;
the socket includes a relieved area, wherein the relieved area decreases responsive to the ball being pressed onto the surface above the threshold pressure; and
at least one of:
at least a portion of a base area of the socket is the relieved area; or
at least a portion of a rim area of the socket is the relieved area.

3. The system of claim 1, wherein:
the socket is relieved at an area where the channel intersects the socket; and
at least one of:
the channel intersects the socket at a base area of the socket; or
the channel intersects the socket at a rim area of the socket.

4. The system of claim 1, wherein an edge of the socket does not extend beyond an equator line of the ball in the socket.

5. The system of claim 1, further comprising: a cover placed over a portion of the ball and a portion of the support, the cover configured to cover a gap between the ball and the socket.

6. The system of claim 5, wherein the cover forms an opening that exposes the ball and the opening is smaller than the ball.

7. The system of claim 6, wherein the cover is configured to contribute to retaining the ball in the socket.

8. The system of claim 6, wherein an equator line of the ball is between the edge of the socket and an edge of the opening of the cover.

9. The system of claim 5, wherein the cover covers only a portion of the gap between the ball and the socket.

10. The system of claim 5, wherein the cover covers the entire gap between the ball and the socket.

11. The system of claim 1, wherein the support includes a beveled edge.

12. The system of claim 1, further comprising a magnet configured to contribute to retaining the ball in the socket.

13. A system configured to form a part in an initial geometry into a desired geometry, the system comprising:
a roller tool; and
a robot arm configured to: (a) press the roller tool onto a surface of the part and (b) move the pressed roller tool along the surface of the part to form the desired geometry, wherein the roller tool includes:
a ball; and
a support with a socket that receives the ball and enables the ball to rotate in the socket, the socket configured to, responsive to the ball being pressed onto the surface above a threshold pressure, deform such that contact area of the ball with the socket increases.

14. The system of claim 13, wherein the contact area of the ball with the socket increases as pressure of the ball onto the surface increases above the threshold pressure.

15. The system of claim 13, wherein the socket includes a relieved area, wherein the relieved area decreases responsive to the ball being pressed onto the surface above the threshold pressure.

16. The system of claim 15, at least one of:
at least a portion of a base area of the socket is the relieved area; or
at least a portion of a rim area of the socket is the relieved area.

17. A system configured to form a part in an initial geometry into a desired geometry, the system comprising:
a roller tool; and
a robot arm configured to: (a) press the roller tool onto a surface of the part and (b) move the pressed roller tool along the surface of the part to form the desired geometry, wherein the roller tool includes:
a ball; and
a support with a socket that receives the ball and enables the ball to rotate in the socket, the support including a channel configured to carry fluid through the support toward the ball or away from the ball.

18. The system of claim 17, wherein the socket is relieved at an area where the channel intersects the socket.

19. The system of claim 17, wherein the channel intersects the socket at a base area of the socket.

20. The system of claim 17, wherein the channel intersects the socket at a rim area of the socket.

* * * * *